United States Patent
Tian et al.

(10) Patent No.: US 12,141,983 B2
(45) Date of Patent: Nov. 12, 2024

(54) IMAGE PROCESSING METHOD AND APPARATUS FOR SEGMENTING OBJECTS

(71) Applicant: Tencent Technology (Shenzhen) Company Limited, Shenzhen (CN)

(72) Inventors: Kuan Tian, Shenzhen (CN); Jun Zhang, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 362 days.

(21) Appl. No.: 17/697,689

(22) Filed: Mar. 17, 2022

(65) Prior Publication Data

US 2022/0207744 A1    Jun. 30, 2022

Related U.S. Application Data

(63) Continuation of application No. PCT/CN2021/086897, filed on Apr. 13, 2021.

(30) Foreign Application Priority Data

May 18, 2020 (CN) .................. 202010419309.X

(51) Int. Cl.
*G06T 7/11* (2017.01)
*G06T 7/194* (2017.01)

(52) U.S. Cl.
CPC ............... *G06T 7/11* (2017.01); *G06T 7/194* (2017.01); *G06T 2207/20081* (2013.01); *G06T 2207/20084* (2013.01); *G06T 2207/30024* (2013.01)

(58) Field of Classification Search
None
See application file for complete search history.

(56) References Cited

U.S. PATENT DOCUMENTS 6,026,223 A * 2/2000 Scepanovic ........... G06F 30/392
                                                716/135
6,771,813 B1 * 8/2004 Katsuyama .......... G06V 10/143
                                                345/589

(Continued)

FOREIGN PATENT DOCUMENTS

CN    101002228 A    7/2007
CN    107341805 A    11/2017

(Continued)

OTHER PUBLICATIONS

Cilla R, Mechery V, Hernandez de Madrid B, Del Signore S, Dotu I, Hatini V (2015) Segmentation and Tracking of Adherens Junctions in 3D for the Analysis of Epithelial Tissue Morphogenesis. PLoS Comput Biol 11(4): e1004124. doi:10.1371/journal.pcbi.1004124 (Year: 2015).*

(Continued)

*Primary Examiner* — Soo Shin
(74) *Attorney, Agent, or Firm* — Crowell & Moring LLP

(57) ABSTRACT

The disclosure provides an image processing method and apparatus. The method may include acquiring a target image having at least two division regions. The division region includes an annotation point, and the annotation point is corresponding to a target segmentation object. The method may further include performing iterative expansion on the annotation points to obtain an iterative expansion region. The method may further include determining a first loss result between the iterative expansion region and the division region and a second loss result between the iterative expansion region and the annotation point. The method may further include, when the first loss result and the second loss result meeting a termination condition, stopping the iterative expansion to obtain a resulting iterative expansion region. The method may further include determining the resulting (Continued)

iterative expansion region as a region where the target segmentation object is located in the target image.

20 Claims, 12 Drawing Sheets

(56) References Cited

U.S. PATENT DOCUMENTS

| | | | | |
|---|---|---|---|---|
| 2005/0163373 A1* | 7/2005 | Lee | ............... | G06T 7/11 |
| | | | | 382/173 |
| 2010/0111396 A1* | 5/2010 | Boucheron | ............. | G06F 18/29 |
| | | | | 382/133 |
| 2011/0002532 A1* | 1/2011 | Frakes | ............... | G06T 7/11 |
| | | | | 382/154 |
| 2011/0243417 A1* | 10/2011 | Madabhushi | ............. | G06T 7/46 |
| | | | | 382/128 |
| 2020/0320701 A1* | 10/2020 | Xiao | ............... | G16H 50/20 |
| 2023/0051951 A1* | 2/2023 | Wang | ............... | G06T 7/174 |

FOREIGN PATENT DOCUMENTS

| | | |
|---|---|---|
| CN | 109614921 A | 4/2019 |
| CN | 109961443 A | 7/2019 |
| CN | 110390676 A | 10/2019 |
| CN | 110503705 A | 11/2019 |
| CN | 111598899 A | 8/2020 |
| GB | 2529813 A * | 3/2016 ........... G06T 7/0012 |

OTHER PUBLICATIONS

International Search Report and Written Opinion with English Translation for International Application No. PCT/CN2021/086897 dated Jul. 20, 2021, 12 pages.

Chinese Office Action for Chinese Patent Application No. 202010419309.X dated Feb. 10, 2021, 8 pages.

Chinese Office Action for Chinese Patent Application No. 202010419309.X dated Dec. 9, 2020, 10 pages.

* cited by examiner

IMAGE PROCESSING METHOD AND APPARATUS FOR SEGMENTING OBJECTS

RELATED APPLICATION

This application is a continuation application of PCT Patent Application No. PCT/CN2021/086897, filed on Apr. 13, 2021, which claims priority to Chinese Patent Application No. 202010419309.X filed with the China National Intellectual Property Administration on May 18, 2020, and entitled "IMAGE PROCESSING METHOD, APPARATUS, DEVICE, AND COMPUTER-READABLE STORAGE MEDIUM", wherein the content of each of the above-referenced applications is incorporated herein by reference in its entirety.

FIELD OF THE TECHNOLOGY

This application relates to the field of Internet technologies, and relates to, but is not limited to, an image processing method, apparatus, device, and computer-readable storage medium.

BACKGROUND OF THE DISCLOSURE

In the field of image processing, it is usually necessary to perform image segmentation processing on images waiting to be processed, such as pathological images or geographic images collected by satellites, thereby segmenting target segmentation objects in target images (such as cells in the pathological images or buildings in the geographic images). Recently, deep learning has been widely applied to tasks such as image detection and segmentation. Deep learning methods usually need to accurately outline boundaries of target segmentation objects, so that models can obtain better image detection and segmentation results.

In the related art, a clustering method is usually used for expanding manual point annotations to pixel-level annotations, and clustering results are used as positive sample annotations to train an image segmentation model, and then the image segmentation model is used for segmenting a target image.

However, the clustering result has a high impact on a segmentation effect of the image segmentation model. Usually, in order to ensure the accuracy of clustering, the result of image segmentation will be smaller than a real target segmentation object in a target image. Therefore, the clustering method in the related art cannot accurately segment an image.

SUMMARY

In view of this, embodiments of this disclosure provide an image processing method, apparatus, device, and computer-readable storage medium. By performing iterative expansion on each annotation point in a target image, an iterative expansion region corresponding to the annotation point is formed. In this way, the number of iterations can be adjusted according to a size difference of the target segmentation object in the target image, so as to accurately segment the target segmentation object.

The technical solutions in the embodiments of this disclosure are implemented as follows.

The embodiments of this disclosure provide an image processing method. The method may include acquiring a target image having at least two division regions. Each of the division regions includes an annotation point, and each of the annotation points is corresponding to a target segmentation object. The method may further include performing iterative expansion on each of the annotation points in the target image to obtain an iterative expansion region corresponding to the annotation point. The method may further include determining a first loss result between the iterative expansion region and the division region and a second loss result between the iterative expansion region and the annotation point, respectively. The method may further include, in response to the first loss result and the second loss result meeting an iteration termination condition, stopping the iterative expansion of the annotation point to obtain a resulting iterative expansion region corresponding to the annotation point. The method may further include determining the resulting iterative expansion region as a region where the target segmentation object is located in the target image.

The embodiments of this disclosure provide an image processing method. The method may include acquiring a pathological image having at least two division regions. Each of the division regions includes an annotation point, and each of the annotation points is corresponding to a cell. The method may further include performing iterative expansion on each of the annotation points in the pathological image to obtain an iterative expansion region corresponding to the annotation point, and determining a first loss result between the iterative expansion region and the division region and a second loss result between the iterative expansion region and the annotation point, respectively. The method may further include, in response to the first loss result and the second loss result meeting an iteration termination condition, stopping the iterative expansion of the annotation point to obtain a resulting iterative expansion region corresponding to the annotation point. The method may further include determining the resulting iterative expansion region as a region where the cell is located in the pathological image.

The embodiments of this disclosure provide an image processing method, and the method is performed by an electronic device, including: displaying, in response to a click operation of a user, a target image corresponding to the click operation on a current interface of a terminal; and triggering an image processing step in response to a triggering operation of the user, for implementing an image processing process on the target image to form a segmented image, and displaying the segmented image on the current interface.

The embodiments of this disclosure provide an image processing apparatus. The apparatus may include a memory operable to store machine-readable instructions and a processor circuitry operable to read the machine-readable instructions. When executing the machine-readable instructions, the processor circuitry may be configured to acquire a target image having at least two division regions. Each of the division regions includes an annotation point, and each of the annotation points is corresponding to a target segmentation object. The processor circuitry may be further configured to perform iterative expansion on each of the annotation points in the target image to obtain an iterative expansion region corresponding to the annotation point and determine a first loss result between the iterative expansion region and the division region and a second loss result between the iterative expansion region and the annotation point, respectively. The processor circuitry may be further configured to, in response to the first loss result and the second loss result meeting an iteration termination condition, stop the iterative expansion of the annotation point to obtain a resulting iterative expansion region corresponding to the annotation point. The processor circuitry may be further configured to determine the resulting iterative expansion region as a region where the target segmentation object is located in the target image.

The embodiments of this disclosure provide a computer program product or a computer program. The computer program product or the computer program includes computer instructions, and the computer instructions are stored in a computer-readable storage medium. The processor of the computer device reads the computer instructions from the computer-readable storage medium, and the processor is configured to execute the computer instructions to implement the above image processing method.

The embodiments of this disclosure provide an image processing device, including a memory configured to store executable instructions; and a processor configured to, when executing the executable instructions stored in the memory, implement the above image processing method.

The embodiments of this disclosure provide a computer-readable storage medium storing executable instructions for, when executed by a processor, implementing the above image processing method.

The embodiments of this disclosure have the following beneficial effects: By acquiring a target image having at least two division regions, and performing iterative expansion on each annotation point in the target image, an iterative expansion region corresponding to the annotation point is formed, and finally, a timing of stopping the iteration is determined according to a first loss result between the iterative expansion region and the division region and a second loss result between the iterative expansion region and the annotation point, respectively. In this way, the number of iterations can be adjusted according to a size difference of a target segmentation object in the target image, and the size of the formed iterative expansion region is closer to the size of the target segmentation object through multiple iterative expansions, so that the target segmentation object can be segmented accurately.

DESCRIPTION OF EMBODIMENTS

To make the objectives, technical solutions, and advantages of this disclosure clearer, the following describes this disclosure in further detail with reference to the accompanying drawings. The described embodiments are not to be considered as a limitation to this disclosure. All other embodiments obtained by a person of ordinary skill in the art without creative efforts shall fall within the protection scope of this disclosure.

In the following descriptions, the term "some embodiments" describes subsets of all possible embodiments, but it may be understood that "some embodiments" may be the same subset or different subsets of all the possible embodiments, and can be combined with each other without conflict. Unless otherwise defined, meanings of all technical and scientific terms used in the embodiments of this disclosure are the same as those usually understood by a person skilled in the art to which the embodiments of this disclosure belong. Terms used in the embodiments of this disclosure are merely intended to describe objectives of the embodiments of this disclosure, but are not intended to limit this disclosure.

In order to better understand an image processing method provided in the embodiments of this disclosure, an image processing method in the related art is first described. In the following description of the related technical solutions and the solutions of this disclosure, illustration may be made by using a pathological image as an example of a target image and using a cell as a target segmentation object.

Pathology is a microscopic study of cell morphology that can complement molecular information in situ. During pathological research, a tissue sample is usually removed from a body and then placed in a fixative, which is used for stabilizing the tissue to prevent decay, to make a pathological section for viewing under a microscope. For viewing under the microscope, different components of the tissue are stained with different stains, and then different staining techniques are applied to visualize specific tissue components under the microscope.

Usually, cells in a pathological section are an important basis for judgment, and therefore, many tasks need to detect and segment cells. Recently, deep learning has been widely applied to tasks such as cell detection and segmentation. Deep learning methods usually need to accurately outline boundaries of cells, so that models can obtain better cell detection and segmentation results. This pixel-level-based data annotation requires consuming a lot of time and manpower, and therefore, simply annotating one point for one cell has become a feasible alternative annotation solution, which can greatly reduce the workload of annotation.

Figure 1:
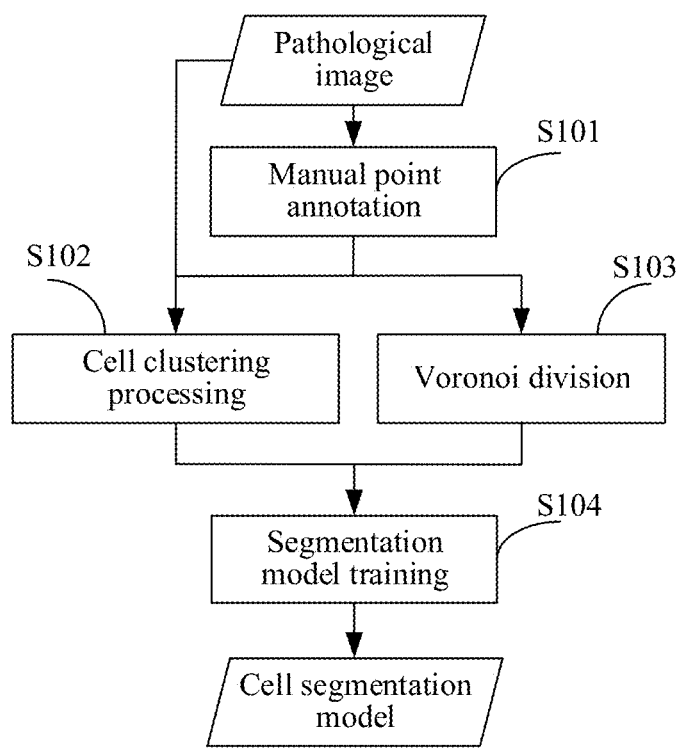
FIG. 1 is a schematic flowchart of an image processing method in the related art.

In the related art, manual point annotations are usually expanded to pixel-level annotations by using a clustering method, and point annotations are used for generating voronoi divisions, then clustering results are used as positive sample annotations, and boundaries of the voronoi divisions are used as negative sample annotations for training a model, and cells are segmented by using the trained model. As shown in FIG. 1, it is a schematic flowchart of an image processing method 100 in the related art, and the method includes the following steps:

Step S101: Perform manual point annotation on a pathological image. Here, a drawing tool or another annotation tool may be used for manually annotating each cell with an annotation point.

Step S102: Perform cell clustering processing on the pathological image to obtain a clustered image.

Here, through a clustering method, the manual annotation points are used as seed points, and the pathological image is clustered to obtain a cell clustering result, which is used as pixel-level annotations of cells.

Step S103: Perform voronoi division on the manual point annotation.

Here, a voronoi division boundary is obtained by performing voronoi division on the manual point annotation, which is used as a background annotation image.

Step S104: Train to obtain a cell segmentation model by using the point annotation as a cell annotation image and the voronoi division boundary as the background annotation image.

The cell segmentation method based on the clustering method in the related art mainly has the following disadvantages: 1) Clustering results of cells are used as pixel-level annotations of cells. Model training results largely depend on the accuracy of the clustering method, and model training results are sensitive to clustering parameters. 2) In order to ensure the correctness of the cell clustering process, a result of the cell clustering process will be smaller than a real cell, and therefore, a final result of the cell segmentation will be smaller than the real cell.

Based on at least one of the above problems existing in the related art, the embodiments of this disclosure provide an image processing method. First, a target image having at least two division regions is acquired, each of the division regions including an annotation point, and each of the annotation points corresponding to a target segmentation object. Then, iterative expansion is performed on each of the annotation points in the target image to obtain an iterative expansion region corresponding to the annotation point, and a first loss result between the iterative expansion region and the division region and a second loss result between the iterative expansion region and the annotation point are determined respectively. Finally, when the first loss result and the second loss result meet an iteration termination condition, the iterative expansion of the corresponding annotation point is stopped. The iterative expansion region obtained when the iterative expansion is stopped is determined as a region where the target segmentation object in the target image is located. In this way, the number of iterations can be adjusted according to a size difference of a target segmentation object in the target image, and the size of the formed iterative expansion region is closer to the size of the target segmentation object through multiple iterative expansions, so that the target segmentation object can be segmented accurately. In addition, the methods of the embodiments of this disclosure may also be implemented based on Artificial Intelligence (AI) technologies.

In the embodiments of this disclosure, image segmentation processing may be implemented based on artificial intelligence technologies, that is, artificial intelligence technologies are used for determining segmentation lines of a to-be-segmented image, so as to implement segmentation processing of the to-be-segmented image. Alternatively, an image segmentation model is trained based on artificial intelligence, that is, the image segmentation model is trained by using the artificial intelligence technologies.

The AI technology is a comprehensive discipline and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. For example, when the AI technologies are used for implementing the image processing method of the embodiments of this disclosure, an AI chip may be used for performing a series of arithmetic processing to obtain a segmentation line of a to-be-segmented image. The embodiments of this disclosure relate to several major directions such as computer vision (CV) and machine learning/deep learning in the AI technologies. The CV technology is a science that studies how to use a machine to "see", and furthermore, is machine vision that a camera and a computer are used for replacing human eyes to perform recognition, tracking, measurement, and the like on a target, and further perform graphic processing, so that the computer processes the target into an image more suitable for human eyes to observe, or an image transmitted to an instrument for detection. As a scientific discipline, the CV studies related theories and technologies and attempts to establish an AI system that can obtain information from images or multidimensional data. The CV technologies generally include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, and map construction, and further include biological feature recognition technologies such as common face recognition and fingerprint recognition. The machine learning (ML) is an interdisciplinarity involving a plurality of disciplines such as the probability theory, statistics, approximation theory, convex analysis, algorithm complexity theory, and the like. The ML specializes in studying how a computer simulates or implements a human learning behavior to obtain new knowledge or skills, and reorganize an existing knowledge structure, so as to keep improving performance of the computer. The ML, as the core of AI, is a basic way to make the computer intelligent, and is applicable to various fields of AI. The ML and deep learning generally include technologies such as an artificial neural network, a belief network, reinforcement learning, transfer learning, inductive learning, and learning from demonstrations.

The method according to the embodiments of this disclosure involves image segmentation processing technologies of artificial intelligence, and computer vision technologies in the artificial intelligence technologies may be combined with a fully convolutional network to divide a target image, thereby forming at least two division regions, each of the division regions including an annotation point. Iterative expansion is performed on each of the annotation points in the target image to form an iterative expansion region corresponding to the annotation point. Finally, when a first loss result between the iterative expansion region and the division region and a second loss result between the iterative expansion region and the annotation point respectively meet an iteration termination condition, the iterative expansion of the annotation point is stopped. According to the iterative expansion region obtained when the iterative expansion is stopped, a region where the target segmentation object in the target image is located is determined, so as to complete the segmentation process of the target segmentation object in the target image. In other embodiments, the segmented image may be further processed based on the artificial intelligence technologies. For example, performing color transformation or coloring on the segmented image to obtain a processed image that meets user needs. In still other embodiments, the artificial intelligence technologies and image segmentation model training technologies may also be combined to implement an artificial intelligence-based image segmentation model training process. The above artificial intelligence-based processing method will be described in subsequent embodiments.

The image processing method provided in the embodiments of this disclosure may be performed by an image processing device, and the image processing device may be any electronic device. Exemplary applications of the image processing device (that is, the electronic device) provided in the embodiments of this disclosure are described below. The image processing device provided in the embodiments of this disclosure may be implemented as a notebook computer, a tablet computer, a desktop computer, a mobile device (for example, a mobile phone, a portable music player, a personal digital assistant, a dedicated messaging device, and a portable game device), an intelligent robot, an in-vehicle computer, a wearable electronic device, a smart home, a VR/AR device, and any other terminal having a screen display function and an image processing function. The image processing device may also be implemented as a server. An exemplary application when the image processing device is implemented as a server will be described below.

Figure 2A:
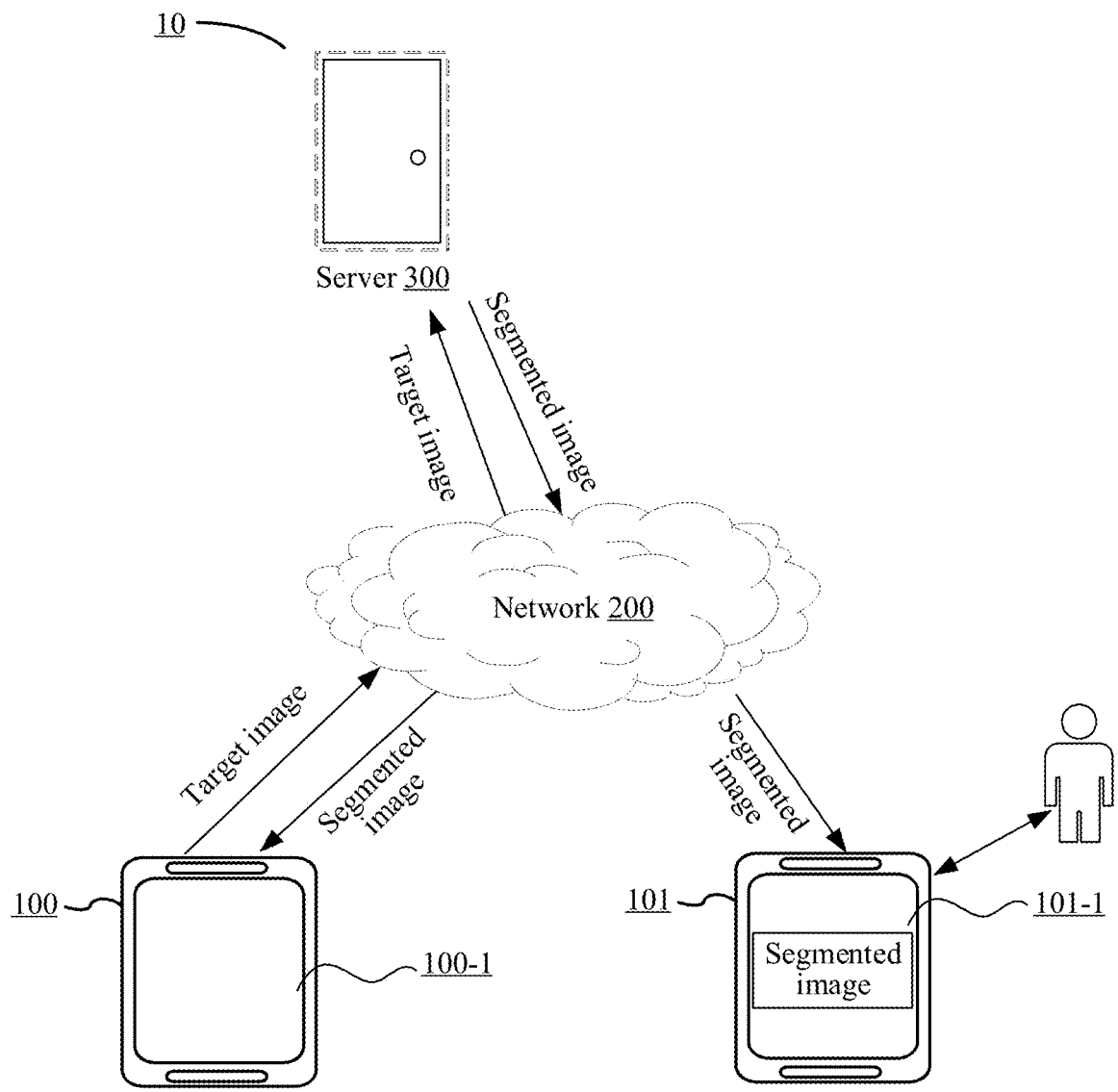
FIG. 2A is a schematic architectural diagram of an image processing system 10 according to an embodiment of this disclosure.

Referring to FIG. 2A, FIG. 2A is a schematic architectural diagram of an image processing system 10 according to an embodiment of this disclosure. In order to support an image processing application to implement segmentation processing of a target image and image processing steps after segmentation, the image processing system 10 includes a terminal 100, a network 200, and a server 300. The terminal 100 runs an image processing application. During implementation of the image processing method according to the embodiments of this disclosure, a collection unit of the terminal 100 collects a target image, acquires manual annotations of a user on the target image to obtain at least two annotation points, each of the annotation points corresponding to a target segmentation object, and transmits the target image having at least two annotation points to a server 300 through a network 200. The server 300 divides the target image to form at least two division regions; performs iterative expansion on each of the annotation points in the target image to form an iterative expansion region corresponding to the annotation point; when a first loss result between the iterative expansion region and the division region and a second loss result between the iterative expansion region and the annotation point respectively meet an iteration termination condition, stops the iterative expansion of the annotation point; and at the same time, determines the iterative expansion region obtained when the iterative expansion is stopped as a region where the target segmentation object in the target image is located. Finally, according to the determined region where the target segmentation object is located, segmentation processing is performed on the target image to obtain an image after segmentation (that is, a segmented image), and the segmented image is returned to the terminal 100 through the network 200. The terminal 100 may display the segmented image on a current interface 100-1. Alternatively, in other embodiments, the server 300 may further process the segmented image, for example, perform color transformation on the segmented image, that is, perform color transformation on the region where the target segmentation object is located, and then transmit the color-transformed image to the terminal 100 through the network 200, so that the terminal 100 may display the color-transformed image on the current interface 100-1.

In some embodiments, after the server 300 forms the segmented image, the segmented image may also be fed back to the terminal 100 through the network 200. After acquiring the segmented image, the terminal 100 may simultaneously display the target image and the segmented image on the current interface 100-1 for the user to view and operate, or may only display the segmented image.

In some embodiments, the image processing system 10 may further include a terminal 101. The terminal 101 and the terminal 100 may be the same terminal, or may be different terminals. Continue to refer to FIG. 2A, the terminal 100 is configured to provide the target image to the server, and the terminal 101 is configured to display the segmented image on a current interface 101-1. For example, the target image may be a pathological image of a hospital, and the terminal 100 is a medical imaging device configured to collect a pathological image of a patient. After collecting the pathological image, the terminal 100 transmits the pathological image to the server 300 for segmentation processing, and obtains the segmented image. After obtaining the segmented image, the server transmits the segmented image to a computer of a doctor, that is, to the terminal 101, so that the doctor can view the segmented image on the terminal 101 and perform pathological analysis according to the segmented image.

Figure 2B:
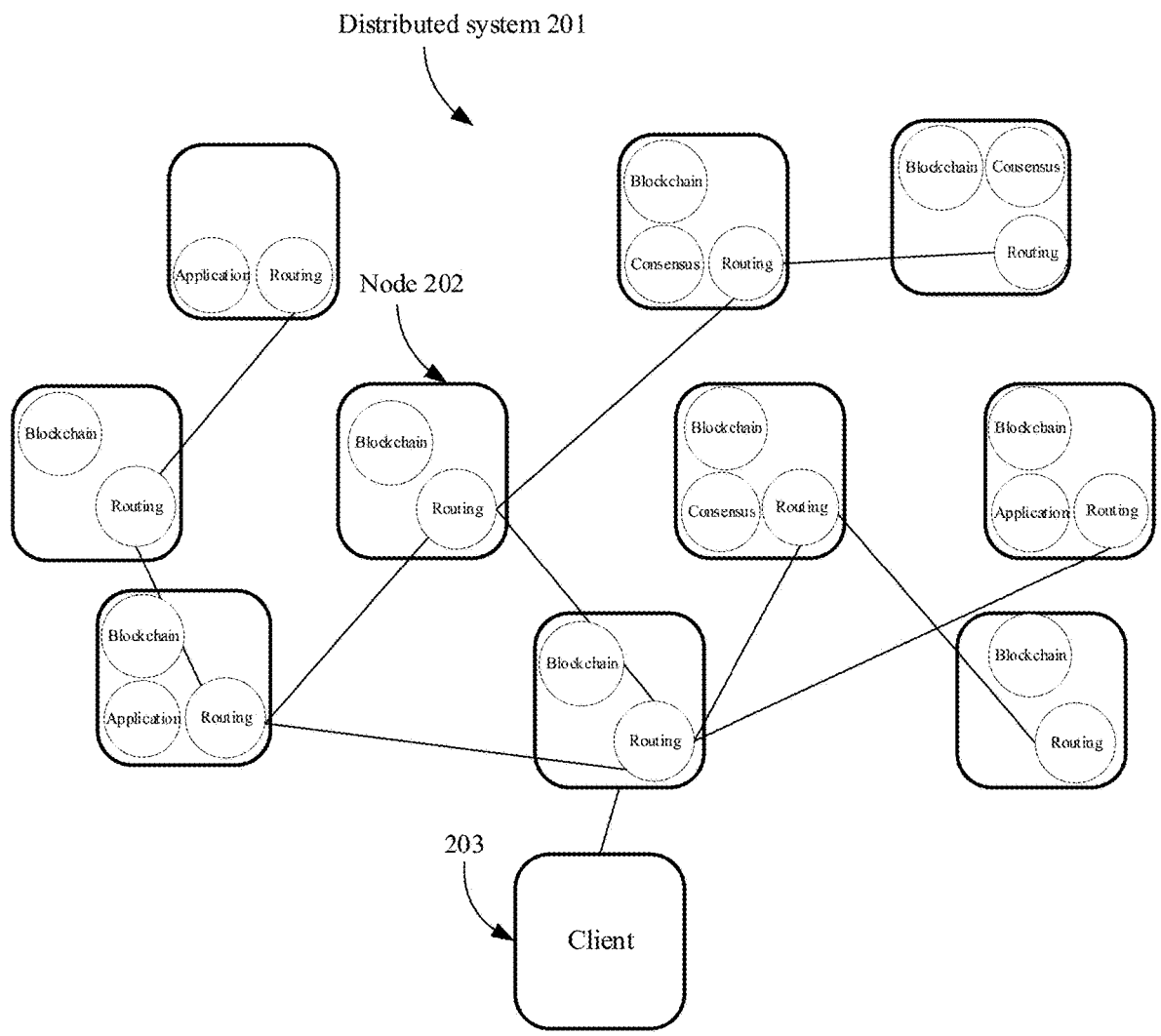
FIG. 2B is a schematic structural diagram of an image processing system 10 applied to a blockchain system according to an embodiment of this disclosure.

The image processing system 10 involved in the embodiments of this disclosure may also be a distributed system 201 of a blockchain system. Referring to FIG. 2B, FIG. 2B is a schematic structural diagram of the image processing system 10 applied to a blockchain system according to an embodiment of this disclosure. The distributed system 201 may be distributed nodes formed by a plurality of nodes 202 (any form of computing device that accesses a network, such as a server and a user terminal) and a client 203. A Peer To Peer (P2P) network is formed between nodes, and a P2P protocol is an application layer protocol running over a Transmission Control Protocol (TCP). Any machine such as a server or a terminal may be added to the distributed system to become a node. The nodes include a hardware layer, an intermediate layer, an operating system layer, and an application layer.

In the distributed system 201, each node 202 corresponds to a terminal 100, and a pathological image of a patient and a segmented image corresponding to the pathological image are collected on each terminal 100. Moreover, based on the analysis of the doctor on the pathological image, the terminal 100 may also collect a disease analysis corresponding to the pathological image of the patient, that is, collect a correspondence between the pathological image and the disease analysis, and store the correspondence in the blockchain system. By collecting the correspondences between the pathological images and disease analysis, and storing the data on the blockchain, it is convenient to perform rapid pathological analysis based on the data stored on the blockchain for identical pathological images in the future. Alternatively, it can be ensured that a physical condition of the same patient may be accurately recorded in real time, which is convenient for early discovery of physical health problems and can provide an accurate clinical basis for a disease treatment of the patient.

In the embodiments of this disclosure, in the blockchain system, the target image and the segmented image on each terminal 100 will be recorded and cannot be changed. Moreover, as the terminal 100 further receives a new target image and a segmented image of the same patient or about a patient with the same condition, due to the data update, the data stored in the blockchain will also be updated correspondingly. In other words, the new target image and the segmented image may also be stored in the blockchain system, so that the target image and the segmented image can be updated in a timely manner.

Referring to functions of various nodes in the blockchain system shown in FIG. 2B, the functions involved in the nodes in the blockchain system are described in detail below: 1) Routing, a basic function of a node, for supporting communication between nodes. In addition to the routing function, the node may also have the following functions: (2) Application: which is deployed in a blockchain, and is used for implementing a particular service according to an actual service requirement, recording data related to function implementation to form recorded data, adding a digital signature to the recorded data to indicate a source of task data, and transmitting the recorded data to another node in the blockchain system, so that the another node adds the recorded data to a temporary block when successfully verifying a source and integrity of the recorded data. For example, services implemented by the application include: (2.1) Wallet: used for providing a transaction function with electronic money, including transaction initiation (where to be specific, a transaction record of a current transaction is sent to another node in the block chain system, and the another node stores, after successfully verifying the transaction record, recorded data of the transaction to a temporary block in a block chain in response to admitting that the transaction is valid). Certainly, the wallet further supports querying for remaining electronic money in an electronic money address. (2.2) Shared ledger: used for providing functions of operations such as storage, query, and modification of account data. Recorded data of the operations on the account data is transmitted to another node in the blockchain system. The another node stores, after verifying that the account data is valid, the recorded data to a temporary block in response to admitting that the account data is valid, and may further transmit an acknowledgment to a node initiating the operations. (2.3) Smart contract: which is a computerized protocol, may be used for executing conditions of a contract, and is implemented by using code that is deployed in the shared ledger and that is executed when a condition is satisfied. The code is used for completing, according to an actual service requirement, an automated transaction, for example, searching for a delivery status of goods purchased by a purchaser, and transferring electronic money of the purchaser to an address of a merchant after the purchaser signs for the goods. Certainly, the smart contract is not limited only to a contract used for executing a transaction, and may be further a contract used for processing received information. (3) Blockchain: including a series of blocks that are consecutive in a chronological order of generation. Once a new block is added to the blockchain, the new block is no longer removed. The block records recorded data submitted by the node in the blockchain system. (4) A consensus is a process in the blockchain network, and is used for reaching consistency in transactions in blocks among a plurality of related nodes, and the consistent blocks are appended to a tail of the blockchain. A mechanism for reaching the consensus includes a proof of work (PoW), a proof of stake (PoS), a delegated proof of stake (DPoS), and a proof of elapsed time (PoET).

Figure 2C:
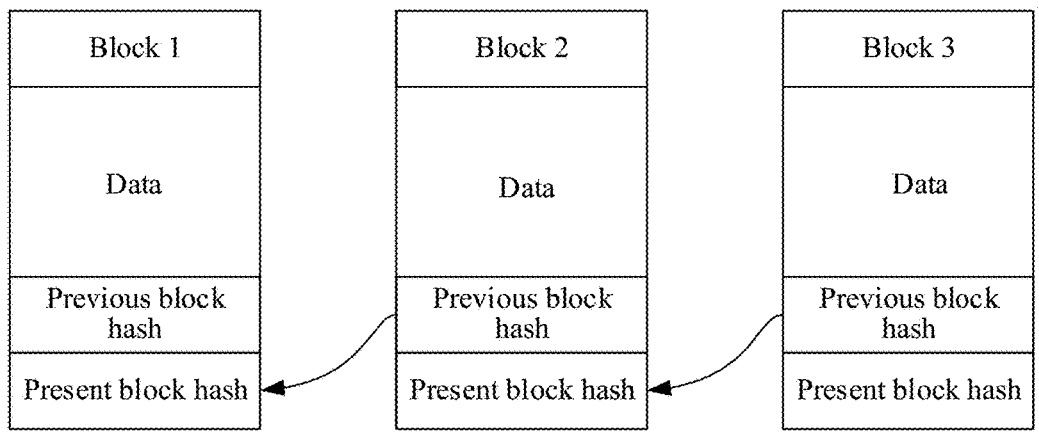
FIG. 2C is a schematic diagram of a block structure according to an embodiment of this disclosure.

Referring to FIG. 2C, FIG. 2C is a schematic diagram of a block structure according to an embodiment of this disclosure. Each block includes a hash value of a transaction record stored in the current block (a hash value of the current block) and a hash value of a previous block. Blocks are connected according to hash values to form a blockchain. In addition, the block may further include information such as a timestamp indicating a block generation time. A blockchain is a decentralized database essentially, and is a series of associated data blocks generated by using a cryptographic method. Each data block includes related information, and is configured to verify the validity (anti-counterfeiting) of the information of the data block, and generate a next block.

Figure 3:
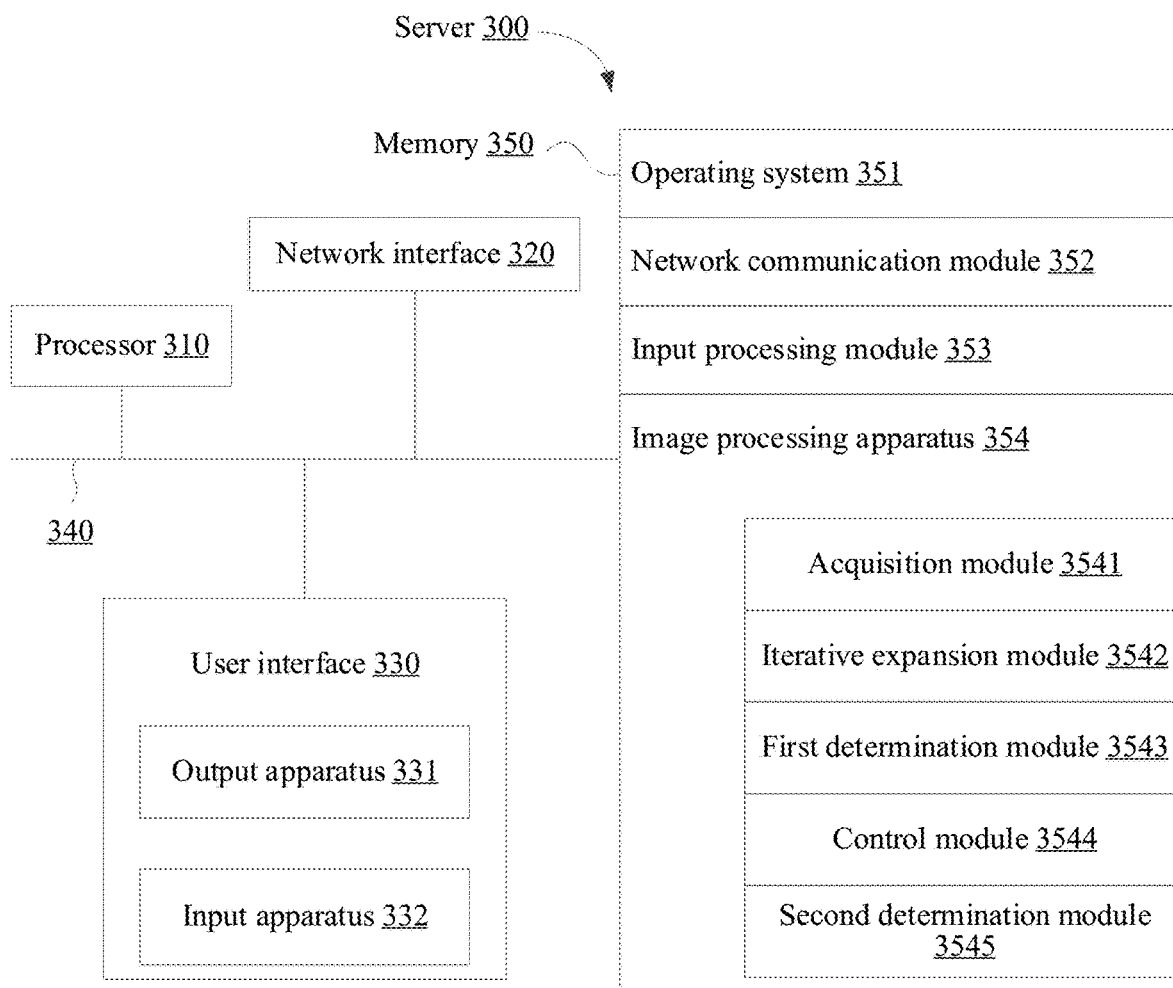
FIG. 3 is a schematic structural diagram of a server according to an embodiment of this disclosure.

Referring to FIG. 3, FIG. 3 is a schematic structural diagram of a server 300 according to an embodiment of this disclosure. The server 300 is used as an image processing device to implement the image processing method provided by at least one embodiment of this disclosure. The server 300 shown in FIG. 3 includes at least one processor 310, a memory 350, at least one network interface 320, and a user interface 330. Various components in the server 300 are coupled together through a bus system 340. It may be understood that the bus system 340 is configured to implement connection and communication between the components. In addition to a data bus, the bus system 340 further includes a power bus, a control bus, and a status signal bus. For ease of clear description, all types of buses are marked as the bus system 340 in FIG. 3.

The processor 310 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any conventional processor, or the like.

The user interface 330 includes one or more output apparatuses 331 that enable presentation of media content. The user interface 330 further includes one or more input apparatuses 332, including user interface components that facilitate user input.

The memory 350 may be removable, non-removable, or a combination thereof. An exemplary hardware device includes a solid state memory, a hard disk drive, or a compact disk drive. The memory 350 may include one or more storage devices that are physically remote from the processor 310. The memory 350 includes a volatile memory or a non-volatile memory, or may include both a volatile memory and a non-volatile memory. The non-volatile memory may be a Read Only Memory (ROM), and the volatile memory may be a Random Access Memory (RAM). The memory 350 described in this embodiment of this disclosure is to include any other suitable type of memories. In some embodiments, the memory 350 may store data to support various operations. Examples of the data include programs, modules, and data structures, or a subset or a superset thereof, which are illustrated below.

The term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

An operating system 351 includes a system program configured to process various basic system services and perform a hardware-related task, for example, a framework layer, a core library layer, and a driver layer, and is configured to implement various basic services and process a hardware-related task.

A network communication module 352 is configured to reach another computing device through one or more (wired or wireless) network interfaces 320. Exemplary network interfaces 320 include: Bluetooth, wireless compatible authentication (WiFi), a universal serial bus (USB), and the like.

An input processing module 353 is configured to detect one or more user inputs or interactions from one of the one or more input apparatuses 332 and translate the detected input or interaction.

In some embodiments, the apparatus provided in the embodiments of this disclosure may be implemented in software. FIG. 3 shows an image processing apparatus 354 stored in a memory 350. The image processing apparatus 354 may be an image processing apparatus in the server 300, which may be software in the form of programs and plug-ins, including the following software modules: an acquisition module 3541, an iterative expansion module 3542, a first determination module 3543, a control module 3544, and a second determination module 3545. These modules are logical, and therefore can be combined or further split arbitrarily according to the functions implemented. Functions of the modules will be explained below.

In other embodiments, the apparatus provided in the embodiments of this disclosure may be implemented by hardware. As an example, the apparatus provided in the embodiments of this disclosure may be a processor in the form of a hardware decoding processor, which is programmed to perform the image processing method according to the embodiments of this disclosure. For example, the processor in the form of a hardware decoding processor may adopt one or more Application Specific Integrated Circuits (ASICs), DSPs, Programmable Logic Devices (PLDs), Complex Programmable Logic Devices (CPLDs), Field-Programmable Gate Arrays (FPGAs), or other electronic components.

Figure 4:
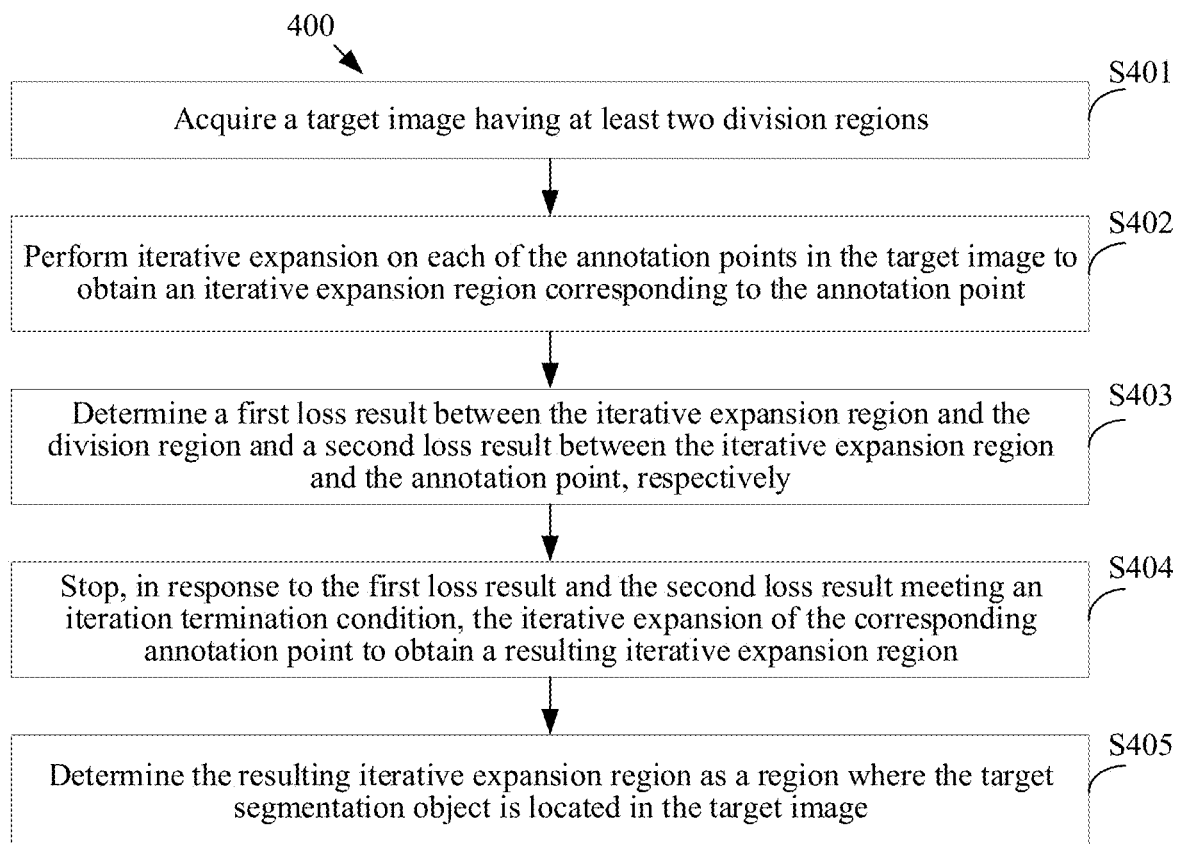
FIG. 4 is a schematic flowchart of an image processing method according to an embodiment of this disclosure.

The image processing method provided in the embodiments of this disclosure will be described below with reference to the exemplary application and implementation of the image processing device provided in the embodiments of this disclosure. The image processing device may be any terminal having a screen display function and an image processing function, or may be a server. In other words, the image processing method in the embodiments of this disclosure may be performed by a terminal or a server, or may be performed by interaction between a terminal and a server. The image processing method provided in the embodiments of this disclosure will be described below by taking the server as an execution subject. Referring to FIG. 4, FIG. 4 is a schematic flowchart of an image processing method 400 according to an embodiment of this disclosure, which will be described with reference to steps shown in FIG. 4.

Step S401: Acquire a target image having at least two division regions.

Here, the target image has a target segmentation object, the target segmentation object forms a foreground image of the target image, and the other parts of the target image except the target segmentation object form a background image of the target image. A difference between the foreground image and the background image is large, that is, there is a large difference between the foreground image and the background image. For example, it may have a large color difference, the color of the foreground image is similar or consistent, and the color of the background image is similar or consistent. Alternatively, there may be a large difference in brightness between the foreground image and the background image. Alternatively, there are multiple target segmentation objects in the foreground image, the target segmentation objects have similar or identical shapes or have similar sizes. Objects in the background image have irregular shapes, or objects in the background image differ greatly in shape and size.

The target image includes at least two annotation points, the annotation points are formed by the user through manual annotation, and each of the annotation points corresponds to a target segmentation object. The annotation point is used for annotating a location of the target segmentation object, and the annotation point is located at a central location of the target segmentation object, or a distance from the central location of the target segmentation object is less than a threshold.

In the embodiments of this disclosure, a drawing tool or another annotation tool may be used for manually annotating each target segmentation object with a mark point, so as to pre-annotate an approximate location of the target segmentation object, and then a region where the target segmentation object is located is determined based on the pre-annotated annotation point.

Each division region includes an annotation point. In some embodiments, the target image may be divided to form at least two division regions. Here, in order to divide the target image, a voronoi division method may be used for dividing the target image to form at least two division regions, each division region including an annotation point, and therefore, the division regions are connected to each other to form the above target image.

In the embodiments of this disclosure, the area of the region where the target segmentation object corresponding to the annotation point in each division region is located is smaller than the area of the division region. In other words, each division region includes one target segmentation object, and the division region is a limit-area region of the target segmentation object. In the embodiments of this disclosure, the division region is obtained by dividing, and when iterative expansion is performed subsequently to determine the region where the target segmentation object is located, the iteration process and a termination condition of the iteration can be constrained, so as to avoid that the area of the region where the target segmentation object obtained by expansion is located is greater than the area of an actual region where the target segmentation object is located.

Step S402: Perform iterative expansion on each of the annotation points in the target image to obtain an iterative expansion region corresponding to the annotation point.

Here, the iterative expansion refers to cyclically expanding the area of the region where the annotation point is located by taking the annotation point as an expansion center. In the embodiments of this disclosure, in the process of each iterative expansion, a size parameter of the expansion may be a preset fixed value, or the size parameter of the iterative expansion may be determined before each iterative expansion, and then according to the determined size parameter, iterative expansion is performed on the annotation point to form an iterative expansion region of the annotation point.

In a first iterative expansion process of the annotation point, the annotation point is used as the expansion center, and expansion is performed outwards once with the size parameter of the iterative expansion to form an iterative expansion region wrapping the annotation point. In a second iterative expansion process, the iterative expansion region formed after the first iterative expansion is used as a starting shape of expansion, and a boundary of the iterative expansion region formed after the first iterative expansion is expanded outwards once according to the size parameter of the iterative expansion. That is, in an $N^{th}$ iterative expansion process, the iterative expansion region formed after an $(N-1)^{th}$ iterative expansion is used as a starting shape of this expansion, and a boundary of the iterative expansion region formed after the $(N-1)^{th}$ iterative expansion is expanded outwards once according to the size parameter of the iterative expansion, where N is greater than or equal to 1.

Step S403: Determine a first loss result between the iterative expansion region and the division region and a second loss result between the iterative expansion region and the annotation point, respectively.

Here, a preset loss model may be configured to determine the first loss result between the iterative expansion region and the division region and the second loss result between the iterative expansion region and the annotation point according to the boundary of the iterative expansion region, the boundary of the division region, and the location of the annotation point. The first loss result and the second loss result are used for representing a similarity of a first distance between the boundary of the iterative expansion region and the boundary of the division region with a preset first distance and a similarity of a second distance between the boundary of the iterative expansion region and the annotation point with a preset second distance. After the first distance and the second distance are determined, the first loss result and the second loss result are determined according to the similarity between the first distance and the preset first distance and the similarity between the second distance and the preset second distance, respectively.

Step S404: Stop the iterative expansion of the corresponding annotation point when the first loss result and the second loss result meet an iteration termination condition.

The iteration termination condition is used for determining whether a boundary of a current iterative expansion region is close to a boundary of the actual region where the target segmentation object is located. When a difference between the boundary of the current iterative expansion region and the boundary of the actual region where the target segmentation object is located is smaller than a threshold, it indicates that the current iterative expansion region may be used for approximately representing or may represent the boundary of the region where the target segmentation object is located. Therefore, the iterative expansion of the annotation point is stopped to avoid that the size of the iterative expansion region is greater than the size of the region where the target segmentation object is located due to the iterative expansion again, so that an error between a result of the iterative expansion and an actual result of the actual region where the target segmentation object is located is large.

Step S405: Determine the iterative expansion region obtained when the iterative expansion is stopped as a region where the target segmentation object in the target image is located.

Here, in a case of determining that the iterative expansion needs to be stopped, the iterative expansion region obtained when the iterative expansion is stopped is determined as the region where the target segmentation object is located. That is, a segmented region of the target image is determined. In some embodiments, after the final iterative expansion region is determined, that is, after the region where the target segmentation object is located is determined, the target image may be segmented according to the iterative expansion region, so as to segment the target segmentation object in the target image and other images except the target segmentation object. In other words, a foreground image and a background image of the target image may be segmented separately for use in other subsequent image processing or image analysis processes.

In the image processing method provided in the embodiments of this disclosure, a target image having at least two division regions is acquired, and iterative expansion is performed on each annotation point in the target image to form an iterative expansion region corresponding to the annotation point. Finally, according to a first loss result between the iterative expansion region and the division region and a second loss result between the iterative expansion region and the annotation point, respectively, a timing of stopping the iteration is determined. In this way, the number of iterations can be adjusted according to a size difference of the target segmentation object in the target image, and the size of the formed iterative expansion region is closer to the size of the target segmentation object through multiple iterative expansions, so that the target segmentation object can be segmented accurately.

In some embodiments, the target image may have a foreground image and a background image, and the foreground image and the background image are distinct. A difference between the foreground image and the background image is large, which is convenient for distinguishing. For example, the color difference between the foreground image and the background image in the target image is large, which is easy to distinguish in color. Moreover, the foreground image has a uniform shape, or the foreground image is a large number of objects with similar shapes. For example, the target image may be a pathological image, and correspondingly, the target segmentation object is a cell. Alternatively, the target image may be a geographic image collected by a satellite, and correspondingly, the target segmentation object is a house or region.

Figure 5:
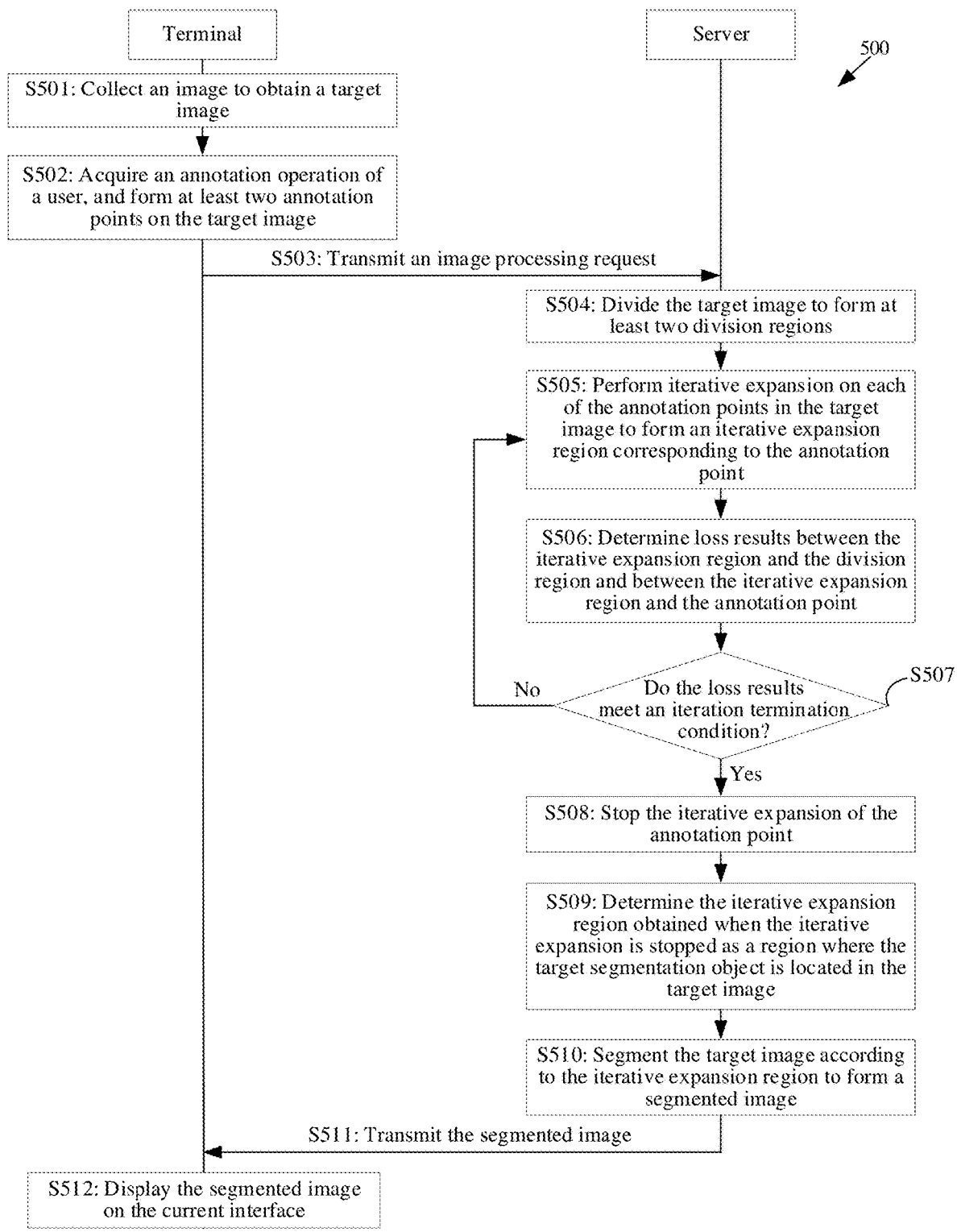
FIG. 5 is a schematic flowchart of an image processing method according to an embodiment of this disclosure.

In some embodiments, the image processing system includes a terminal and a server. The terminal may be any type of terminal. For example, the terminal may be a mobile phone or a camera device with an image collection function, or a medical imaging device. The terminal acquires the target image, and transmits the target image to the server for segmentation processing. FIG. 5 is a schematic flowchart of an image processing method 500 according to an embodiment of this disclosure. As shown in FIG. 5, the method 500 includes the following steps:

Step S501: Collect, by a terminal, an image to obtain a target image.

Here, the terminal may have an image collecting device, and the image is collected by the image collecting device. Alternatively, the terminal may download the image on the network, or the terminal may acquire the image from a specific dataset.

Step S502: Acquire, by the terminal, an annotation operation of the user, and form at least two annotation points on the target image. After collecting the target image, the terminal may display the target image on a current interface, for annotating each target segmentation object with an annotation point by using a drawing tool or other annotation tool, so as to pre-annotate an approximate location of the target segmentation object, thereby forming at least two annotation points on the target image.

Step S503: Transmit, by the terminal, an image processing request to the server, the image processing request including the target image having the at least two annotation points.

Step S504: Divide, by the server, the target image to form at least two division regions, each of the division regions including one of the annotation points.

Here, step S504 may be implemented by the following steps:

Step S5041: Divide the target image according to the at least two annotation points to form at least two division regions having continuous polygonal shapes. Every two annotation points may be connected into a line segment, and a continuous polygon formed by vertical bisectors of line segments may be determined as a division region obtained by dividing.

Step S505: Perform, by the server, iterative expansion on each of the annotation points in the target image to form an iterative expansion region corresponding to the annotation point.

Step S506: Determine, by the server, loss results between the iterative expansion region and the division region and between the iterative expansion region and the annotation point. The loss results between the iterative expansion region and the division region and between the iterative expansion region and the annotation point include a first loss result between the iterative expansion region and the division region and a second loss result between the iterative expansion region and the annotation point.

Step S507: Judge whether the loss results meet an iteration termination condition.

When the judgment result is yes, step S508 is performed. When the judgment result is no, step S505 is performed again.

Step S508: Stop, by the server, the iterative expansion of the annotation point.

Step S509: Determine, by the server, the iterative expansion region obtained when the iterative expansion is stopped as a region where the target segmentation object in the target image is located.

In some embodiments, when the target image is a pathological image and the target segmentation object is a cell, step S509 may be determining the iterative expansion region obtained when the iterative expansion is stopped as a region where the cell in the pathological image is located.

Step S510: Segment, by the server, the target image according to the iterative expansion region obtained when the iterative expansion is stopped to form a segmented image. For example, when the target segmentation object is a cell, the cell may be segmented from the target image.

Step S511: Transmit, by the server, the segmented image to the terminal.

Step S512: Display, by the terminal, the segmented image on the current interface.

In the image processing method provided in the embodiments of this disclosure, a medical imaging device serving as a terminal, is used for collecting a pathological image and transmitting the collected pathological image to a server for processing, thereby obtaining a segmented image of a cell and implementing image segmentation processing of the pathological image. Cells have the same color and similar shapes, and therefore, using the iterative expansion process in the embodiments of this disclosure can accurately segment the cells in the pathological image. Moreover, the size of the formed iterative expansion region is closer to the size of the cell through multiple iterative expansions, so that the cell in the pathological image can be segmented accurately.

In some embodiments, an image processing method is provided, including the following steps:

Step S11: Display, in response to a click operation of a user, a target image corresponding to the click operation on a current interface of a terminal.

Here, the click operation of the user may be a selection operation of the user on the current interface of the terminal, and the user may select, on the terminal, a target image for image processing. After receiving the click operation of the user, the terminal displays the selected target image on the current interface.

Step S12: Trigger an image processing step in response to a triggering operation of the user, for implementing an image processing process of the target image to form a segmented image, and display the segmented image on the current interface.

Here, the trigger operation may be an operation that triggers the terminal to perform image processing. After the user selects the target image, a selection button may be displayed on the current interface of the terminal, and the selection button is configured to remind the user whether to choose to start image processing, that is, remind the user whether to perform image segmentation. When the user selects the start button, the trigger operation is correspondingly performed. Correspondingly, the terminal triggers the image processing step, and transmits the target image to the server, so that the server performs segmentation processing on the target image to form a segmented image. The segmented image is transmitted to the terminal to be displayed on the current interface of the terminal.

Figure 6:
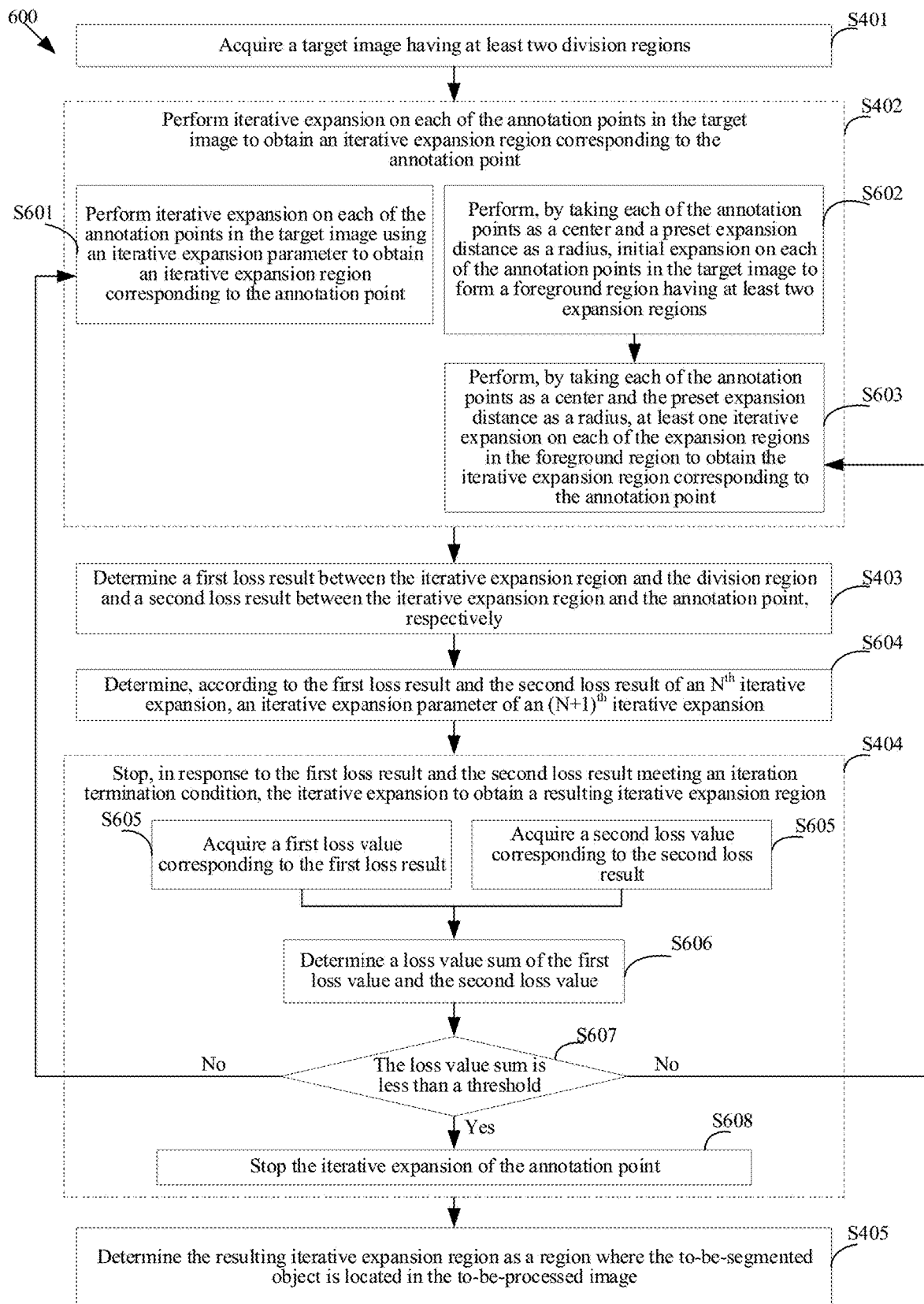
FIG. 6 is a schematic flowchart of an image processing method according to an embodiment of this disclosure.

FIG. 6 is a schematic flowchart of an image processing method 600 according to an embodiment of this disclosure. As shown in FIG. 6, step S402 may be implemented by the following steps:

Step S601: Perform iterative expansion on each of the annotation points in the target image by using an iterative expansion parameter to obtain an iterative expansion region corresponding to the annotation point.

Here, the iterative expansion parameter is a size parameter for performing iterative expansion. In some embodiments, the iterative expansion parameter includes an expansion distance, and the expansion distance refers to a diameter of the outward expansion during each iterative expansion. In the process of iterative expansion, the expansion distance of each expansion may be the same or different. The expansion distance of each expansion may be a preset fixed value, or may be a random value determined according to a current iterative expansion region.

In some embodiments, step S601 may be implemented by the following steps: Step S6011: Perform, by taking each of the annotation points as a center and the expansion distance as a radius, iterative expansion on each of the annotation points in the target image to form an iterative expansion region corresponding to the annotation point.

Continue to refer to FIG. 6, in some embodiments, step S402 may further be implemented by the following steps:

Step S602: Perform, by taking each of the annotation points as a center and a preset expansion distance as a radius, initial expansion on each of the annotation points in the target image to form a foreground region having at least two expansion regions.

Here, the initial expansion refers to expanding the annotation point. Since there is no expansion region with a certain area during the initial expansion, a circle may be formed directly according to the annotation point and the preset expansion distance, and the circle is the expansion region of the annotation point. After the initial expansion is performed on the annotation points, each of the annotation points corresponds to a circle, and multiple circles together form the foreground region. The foreground region refers to a region formed by the expansion regions. The foreground region includes a region where the target segmentation object of the target image is located, and the foreground region does not include a region where a background image of the target image is located.

Step S603: Perform, by taking each of the annotation points as a center and the preset expansion distance as a radius, at least one iterative expansion on each of the expansion regions in the foreground region to obtain the iterative expansion region corresponding to the annotation point.

Here, after the initial expansion, an expansion region of the initial expansion is formed, and in a subsequent iterative expansion process, iterative expansion may be performed on the expansion region at least once by taking a boundary of the expansion region as an expansion starting location.

Continue to refer to FIG. 6, in some embodiments, the method further includes:

Step S604: Determine, according to the first loss result and the second loss result of an $N^{th}$ iterative expansion, an iterative expansion parameter of an $(N+1)^{th}$ iterative expansion; where N is greater than or equal to 1.

In some embodiments, step S604 may be implemented by the following steps:

Step S6041: Acquire, when a sum of the first loss result and the second loss result of the $N^{th}$ iterative expansion is greater than a threshold, a pixel point of each of the annotation points in the iterative expansion region of the $N^{th}$ iterative expansion.

Here, when the sum of the first loss result and the second loss result of the $N^{th}$ iterative expansion is greater than the threshold, it indicates that there is a large difference between the iterative expansion region obtained by the $N^{th}$ iterative expansion and an actual region where the to-be-segmented image is located, and therefore, it is necessary to perform iterative expansion continuously. Then, an iterative expansion parameter of the next iterative expansion may be determined continuously. In the embodiments of this disclosure, the iterative expansion parameter may be determined according to the number of pixels in the iterative expansion region.

Step S6042: Determine a pixel distance between pixel points in adjacent iterative expansion regions of each annotation point. The pixel distance refers to the number of pixels.

Step S6043: Determine, according to the pixel distance, an expansion distance for performing the $(N+1)^{th}$ iterative expansion to obtain the iterative expansion parameter.

Here, an iterative expansion region closest to the annotation point may be determined as a target iterative expansion region, and a pixel point distance between a pixel point on a boundary of the target iterative expansion region and the annotation point is determined as the iterative expansion parameter of the $(N+1)^{th}$ iterative expansion.

Continue to refer to FIG. 6, step S404 may be implemented by the following steps:

Step S605: Acquire a first loss value corresponding to the first loss result and a second loss value corresponding to the second loss result.

Step S606: Determine a loss value sum of the first loss value and the second loss value.

Step S607: Determine whether the loss value sum is less than a threshold.

When the judgment result is yes, step S608 is performed. When the judgment result is no, step S601 or step S603 is performed again.

Step S608: Stop the iterative expansion of the annotation point.

In some embodiments, the target image may be processed by using an image segmentation model to obtain the region where the target segmentation object in the target image is located. The image segmentation model includes a fully convolutional network, and the fully convolutional network is used for performing image segmentation processing on sample images. In some embodiments, the image segmentation model further includes an iterative expansion model, and the iterative expansion model is configured to perform iterative expansion on sample annotation points in a sample image according to iterative expansion parameters.

Figure 7:
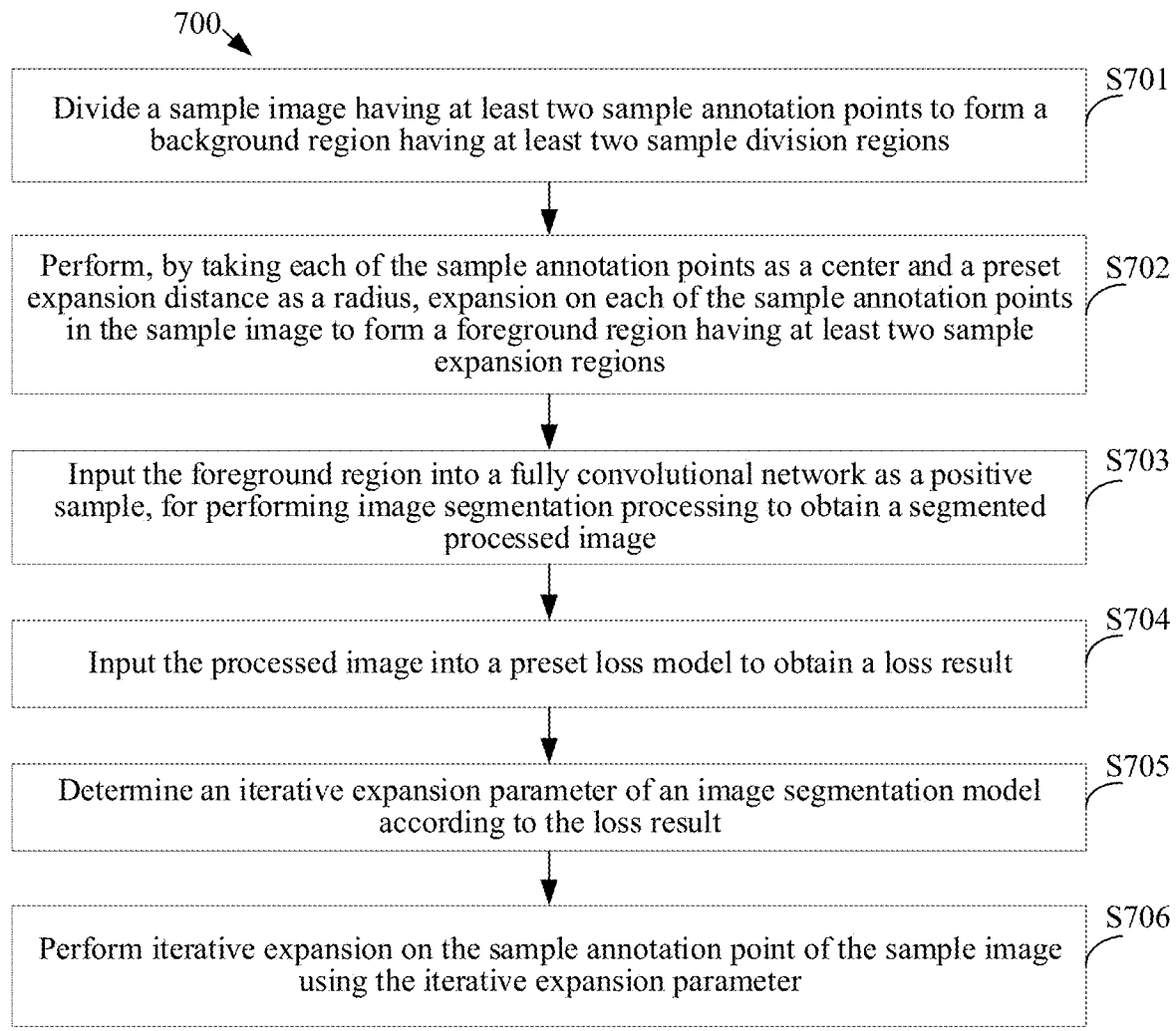
FIG. 7 is a schematic flowchart of training an image segmentation model according to an embodiment of this disclosure.

FIG. 7 is a schematic diagram of a schematic flowchart of training an image segmentation model according to an embodiment of this disclosure. As shown in FIG. 7, the training method 700 includes the following steps:

Step S701: Divide a sample image having at least two sample annotation points to form a background region having at least two sample division regions. The background region refers to a region formed by the sample division regions.

Step S702: Perform, by taking each of the sample annotation points as a center and a preset expansion distance as a radius, expansion on each of the sample annotation points in the sample image to form a foreground region having at least two sample expansion regions. The foreground region refers to a region formed by the sample expansion regions. The foreground region includes a region where a target segmentation object of the sample image is located, and the foreground region does not include a region where a background image of the sample image is located.

Step S703: Input the foreground region into a fully convolutional network as a positive sample, for performing image segmentation processing to obtain a segmented processed image.

Step S704: Input the processed image into a preset loss model to obtain a loss result.

In some embodiments, step S704 may be implemented by the following steps:

Step S7041: Determine a first sample loss value between the sample expansion region and the sample division region by using the preset loss model. Step S7042: Determine a second sample loss value between the sample expansion region and the sample annotation point by using the preset loss model. Step S7043: Determine a sum of the first sample loss value and the second sample loss value as the loss result.

Here, the first sample loss value between the sample expansion region and the sample division region refers to a first distance difference between a boundary of the sample expansion region and a boundary of the sample division region. The second sample loss value between the sample expansion region and the sample annotation point refers to a second distance difference between the boundary of the sample expansion region and the sample annotation point.

When both the first distance difference and the second distance difference meet a certain condition, it indicates that a similarity between the formed sample expansion region and an actual region where the target segmentation object is located is relatively high.

Step S705: Determine an iterative expansion parameter of an image segmentation model according to the loss result.

In some embodiments, step S705 may be implemented by the following steps:

Step S7051: Acquire, when the loss result is greater than a threshold, a pixel point in a sample expansion region of each of the sample annotation points. Step S7052: Determine a pixel distance between each of the sample annotation points and a pixel point in an adjacent sample expansion region. Step S7053: Determine the iterative expansion parameter of the image segmentation model according to the pixel distance.

Step S706: Perform iterative expansion on the sample annotation point of the sample image by using the iterative expansion parameter, so as to implement iterative training of the image segmentation model.

In the embodiments of this disclosure, in the iterative training process, a weight in the fully convolutional network may be corrected according to the loss result obtained after each iterative expansion.

In the process of implementation, a similarity between the segmented processed image and a preset processed image may be determined. The preset processed image may be an image obtained by manually segmenting the sample image, and the preset processed image includes the region where the target segmentation object is located.

In the embodiments of this disclosure, the loss result is determined according to the similarity, and when the similarity is greater than a similarity threshold, the correction of the fully convolutional network is stopped. When the similarity is less than the similarity threshold, the above step S705 is used for determining the iterative expansion parameter, and iterative expansion is performed on the sample annotation point of the sample image by using the determined iterative expansion parameter. That is, iterative expansion is performed again on the segmented processed image obtained by the last expansion of the fully convolutional network, and a weight parameter of the fully convolutional network is corrected according to the iterative expansion parameter. The corrected weight parameter of the fully convolutional network is output as a weight parameter of the neural network for further performing iterative expansion on the segmented processed image in the next iterative expansion process.

In some embodiments, the method further includes: Step S71: Filter the processed image according to the iterative expansion parameter to obtain a filtered processed image.

Here, a distance filter may be used for filtering the processed image, so that a boundary of a sample expansion region in the filtered processed image is clearer.

Correspondingly, step S706 may be implemented by the following steps: Step S7061: Perform the iterative expansion on the sample expansion region in the filtered processed image by using the iterative expansion parameter, so as to implement iterative training of the image segmentation model.

In the embodiments of this disclosure, in the process of obtaining the image segmentation model through training, iterative expansion is performed based on the pre-annotated sample annotation point, and the loss result is determined according to the first sample loss value between the sample expansion region and the sample division region and the second sample loss value between the sample expansion region and the sample annotation point, so as to gradually optimize the image segmentation model. In this way, the optimized image segmentation model can perform accurate image segmentation processing on the target image.

The following describes an exemplary application of this embodiment of this disclosure in an actual application scenario.

In order to obtain a cell segmentation result equivalent to pixel-level annotation by using point annotation, a weakly supervised cell segmentation method based on point annotation is provided in the embodiments of this disclosure, which can effectively reduce the workload of data annotation.

The method in the embodiments of this disclosure first uses point annotations to generate voronoi plane divisions, trains a cell segmentation model by introducing the point annotations and the voronoi divisions as supervision information at the same time, and then uses prediction results of the cell segmentation model as new point annotations, for training a new cell segmentation model as a new round of supervision information together with the voronoi divisions. In the method of the embodiments of this disclosure, after three rounds of iterations, the segmentation model can accurately segment the cells. The innovations of the embodiments of this disclosure mainly include: generating voronoi divisions through point annotations, and regarding them as additional supervision information; and gradually improving the accuracy of cell segmentation by iteration, so that the segmentation model can accurately segment cells.

In the embodiments of this disclosure, a segmentation model is first trained by using point annotations and voronoi boundaries as supervision information, then model prediction results are used as new point annotations, and a real cell range is gradually fitted through three rounds of iterations. A distance filter is introduced in each round of iteration so that the model gradually covers the entire cell range, thereby obtaining a final cell segmentation model.

Figure 8:
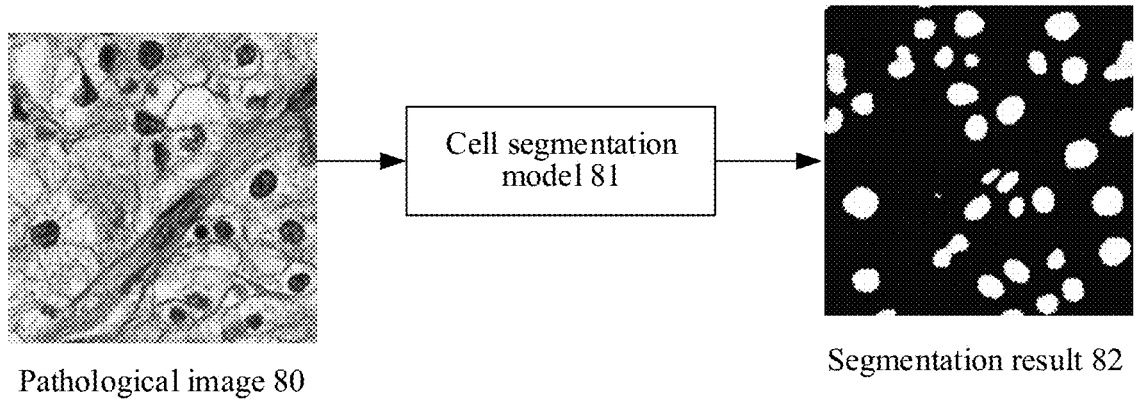
FIG. 8 is a schematic diagram of a product-side disclosure scenario according to an embodiment of this disclosure.

The embodiments of this disclosure may provide image processing services in the form of a software interface. The input target image may be a pathological image, and the output processed image may be a cell pixel-level segmentation result. As shown in FIG. 8, it is a schematic diagram of a product-side application scenario according to an embodiment of this disclosure. A pathological image 80 is input, and a cell segmentation model 81 is used for performing segmentation processing on the pathological image 80 to obtain and output a segmentation result 82.

An image processing method is provided in the embodiments of this disclosure, which is mainly divided into two processes: a manual point annotation process and an iteration process. In the manual point annotation process, a relatively simple cell location annotation is obtained through the manual annotation method. In the iteration process, the manual point annotation or the model prediction result is used as a new cell point annotation after passing through the distance filter, and a final cell segmentation model is obtained through multiple rounds of iterations.

Figure 9:
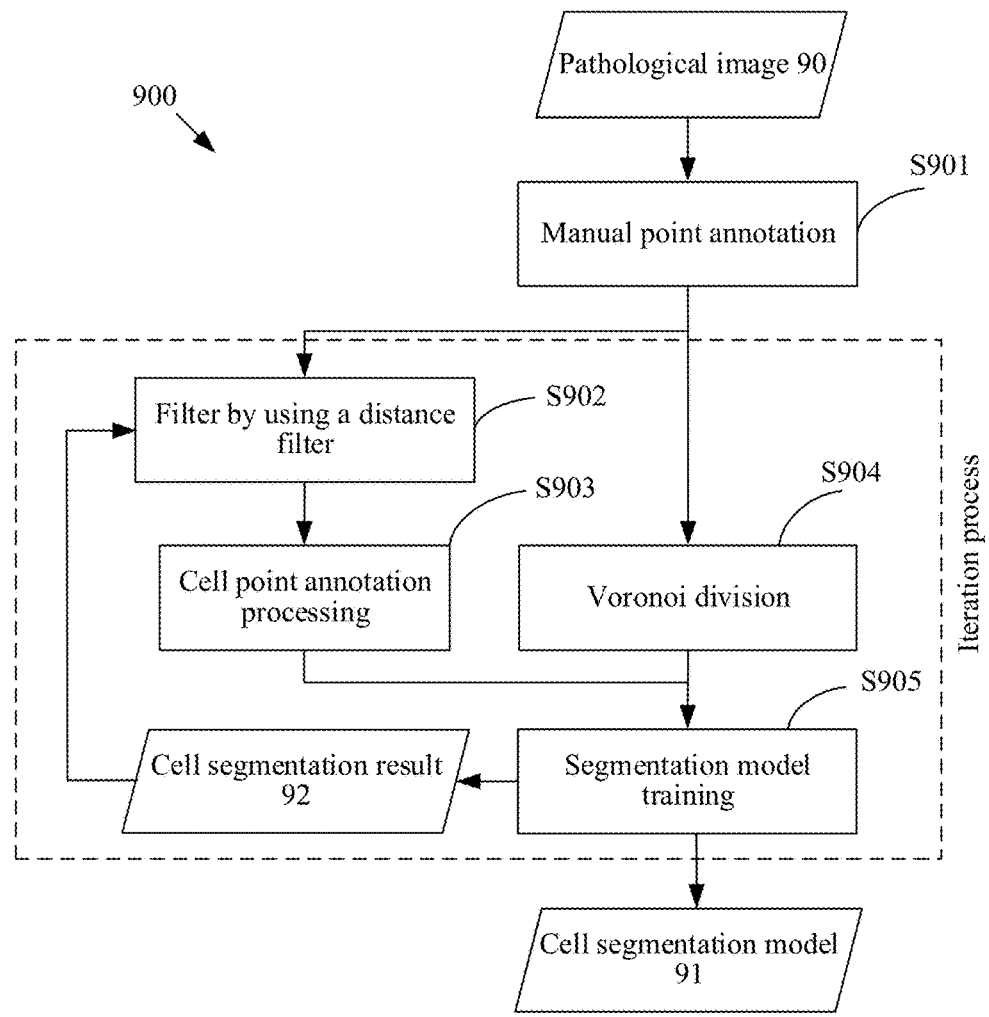
FIG. 9 is a schematic flowchart of an image processing method according to an embodiment of this disclosure.

FIG. 9 is an exemplary schematic flowchart of an image processing method 900 according to an embodiment of this disclosure. As shown in FIG. 9, the method 900 includes two processes including a manual point annotation process and an iteration process, and the manual point annotation process includes the following steps:

Step S901: Perform manual point annotation on a pathological image 90.

Figure 10:
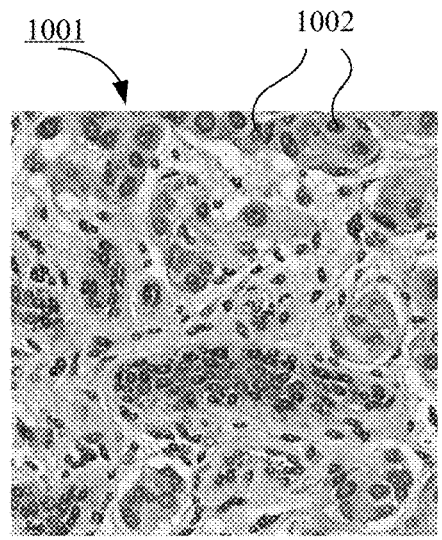
FIG. 10 is a target image after manual point annotation according to an embodiment of this disclosure.

Here, each cell in the pathological image 90 is annotated by the manual point annotation to indicate a location of the cell. As shown in FIG. 10, it is a target image after manual point annotation according to an embodiment of this disclosure. The target image 1001 after the manual point annotation includes at least one annotation point 1002.

Continue to refer to FIG. 9, in the embodiments of this disclosure, the iteration process includes the following steps:

Step S902: Filter a manual point annotation image by using a distance filter to obtain a new cell point annotation image.

Here, the distance filter filters the image to obtain a new cell point annotation image, and a calculation process of the distance filter is shown in the following formula (1-1):

$$d_{i,j} = ax(0, 1 - \alpha\sqrt{(i-k)^2 - (j-m)^2}) \qquad (1\text{-}1);$$

where, $d_{i,j}$ indicates a distance of a pixel point (i, j); (k, m) indicates a location of a foreground pixel point closest to the pixel point (i, j), where the foreground pixel point refers to a pixel point of a foreground image, and the foreground image refers to an image of a cell in a pathological image (that is, a target segmentation object in a target image); a is a coefficient that indicates the size of an outward expansion range of the distance of the pixel point (i, j). For example, it may be set to 0.1, and each time the distance is expanded by about 10 pixels.

Step S903: Perform cell point annotation processing on the cell point annotation image.

Here, a result of the cell point annotation is initially a result obtained after the manual point annotation is filtered by the distance filter. After participating in the training of the segmentation model, a prediction result of the segmentation model is filtered by the distance filter as a new cell point annotation image, and a new segmentation model is trained continuously by using the new cell point annotation image. In this way, after multiple rounds of iterations, a final cell segmentation model is obtained.

Step S904: Perform voronoi division on the manual point annotation image to obtain a voronoi division image.

Figure 11:
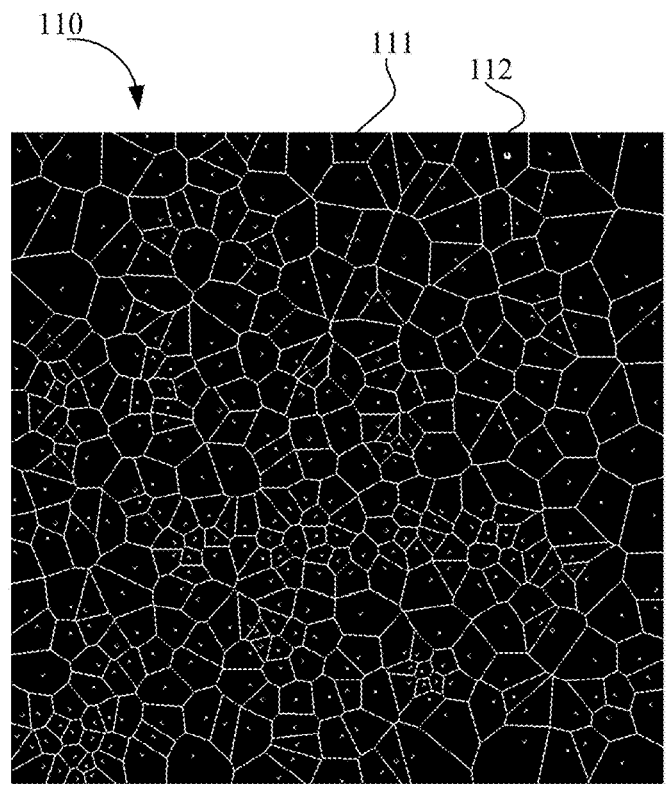
FIG. 11 is a schematic diagram of a voronoi division image according to an embodiment of this disclosure.

Since voronoi division may be performed on a plane through manual point annotation, a voronoi boundary may be obtained by using the voronoi division technique, thereby obtaining the voronoi division image. The voronoi boundary remains unchanged during the iteration. FIG. 11 is a schematic diagram of a voronoi division image according to an embodiment of this disclosure. As shown in FIG. 11, the voronoi division is shown by white lines. The voronoi division image 110 obtained by the voronoi division includes at least one closed division region 111, and each division region includes a manual annotation point 112.

Figure 12:
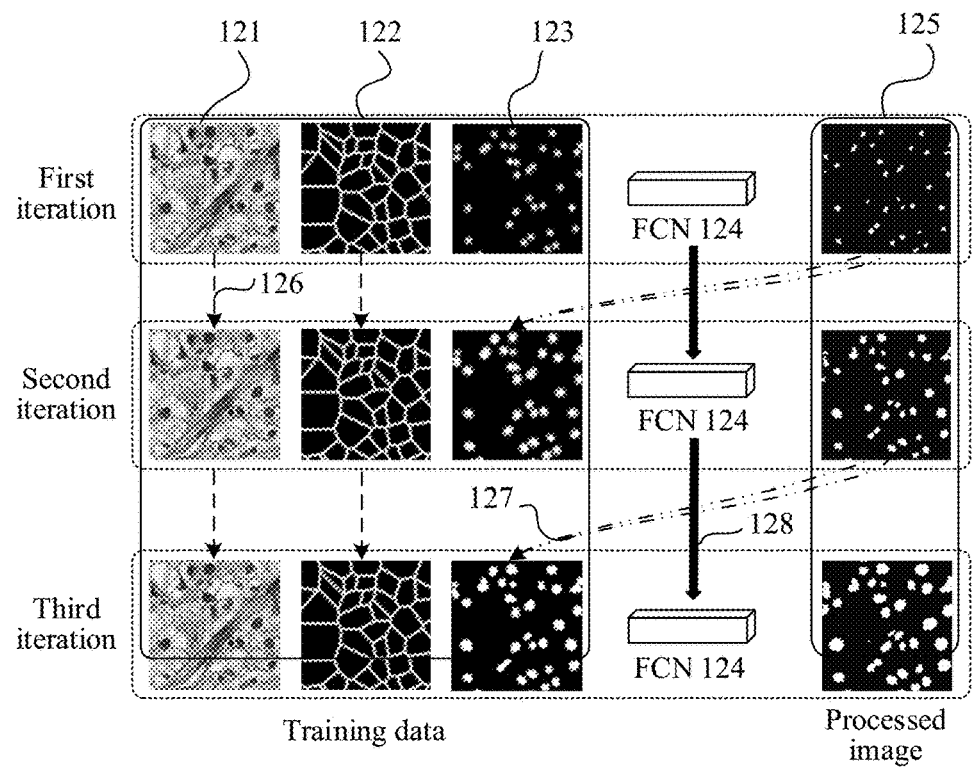
FIG. 12 is a schematic diagram of an iteration process of cell point annotation according to an embodiment of this disclosure.

FIG. 12 is a schematic diagram of an iteration process of cell point annotation according to an embodiment of this disclosure. As shown in FIG. 12, a first column 121 is an original pathological image (that is, a target image), a second column 122 is a voronoi division image, and a third column 123 is an iteration process image of cell point annotation. In each iteration process, the cell point annotation image is input into a fully convolutional network (FCN) 124, and convolution processing is performed to obtain a processed image 125. The original pathological image in the first column 121, the voronoi division image in the second column 122, and the iteration process image of cell point annotation in the third column 123 together constitute training data for a model training process.

In the next iteration process, the processed image 125 obtained last time may be filtered through a distance filter, and the filtered processed image is used as an input image in the next iteration process, and then input to the fully convolutional network 124. The iteration is performed circularly in this way, thereby completing the cell segmentation of the pathological image, and training to obtain a cell segmentation model.

A single dashed arrow 126 in FIG. 12 indicates replication, that is, the pathological image in the first column 121 and the voronoi division image in the second column 122 are the same during each iteration. A double dashed arrow 127 indicates distance filter filtering, that is, after each iteration processing is completed, the distance filter filtering is performed on the processed image 125 once. A single solid arrow 128 indicates weight transfer, that is, a weight of the fully convolutional network 124 in each iteration process will be iteratively updated according to the loss result, and the updated weight will be transferred to the fully convolutional network 124 in the next iteration process.

Step S905: Train the segmentation model according to the cell point annotation image and the voronoi division image.

For the cell point annotation image and the voronoi division image, training may be performed by introducing a cell point annotation loss model (point loss) and a voronoi loss model (voronoi loss). The cell point annotation loss model and the voronoi loss model perform loss calculation through the following functions (1-2) and (1-3):

$$\text{Loss}_{point} = \|\text{ReLU}(D) \cdot (f(I) - D)\|_F^2; \qquad (1\text{-}2)$$

$$\text{Loss}_{voronoi} = \|\text{ReLU}(V) \cdot (f(I) - V)\|_F^2; \qquad (1\text{-}3)$$

where $\text{Loss}_{point}$ indicates a loss result of the cell point annotation loss model; $\text{Loss}_{voronoi}$ indicates a loss result of the voronoi loss model; D indicates the cell point annotation, and V indicates a boundary of a division region in the voronoi division image; I indicates the input pathological image; $f$ indicates the segmentation model; ReLU indicates a linear rectification function; $\| f_F$ indicates a Frobenius norm; and $$\| \|_F^2$$

indicates a square of the Frobenius norm. The overall loss result for the trained model is a sum of $\text{Loss}_{point}$ and $\text{Loss}_{voronoi}$.

In the embodiments of this disclosure, the training process may be training by using any dataset. For example, a public dataset Monuseg may be used. After data enhancement is performed on sample images in the dataset, the data-enhanced images are input into an FCN model as training data for training. In some embodiments, the FCN models include, but are not limited to, fully convolutional network models such as a LinkNet model and a Densenet model. Weight initialization of the model may use an image net dataset (where the size of the input image is 512*512 pixels, the batch size is 8, the learning rate is 0.0001, and the maximum number of iterations is 200 epoch), and finally a cell segmentation model 91 is obtained.

In the embodiments of this disclosure, a cell segmentation result 92 indicates a prediction result of the training data obtained by the cell segmentation model 91 in each iteration, as shown in the processed images 125 in the last column of FIG. 12.

Figure 13A:
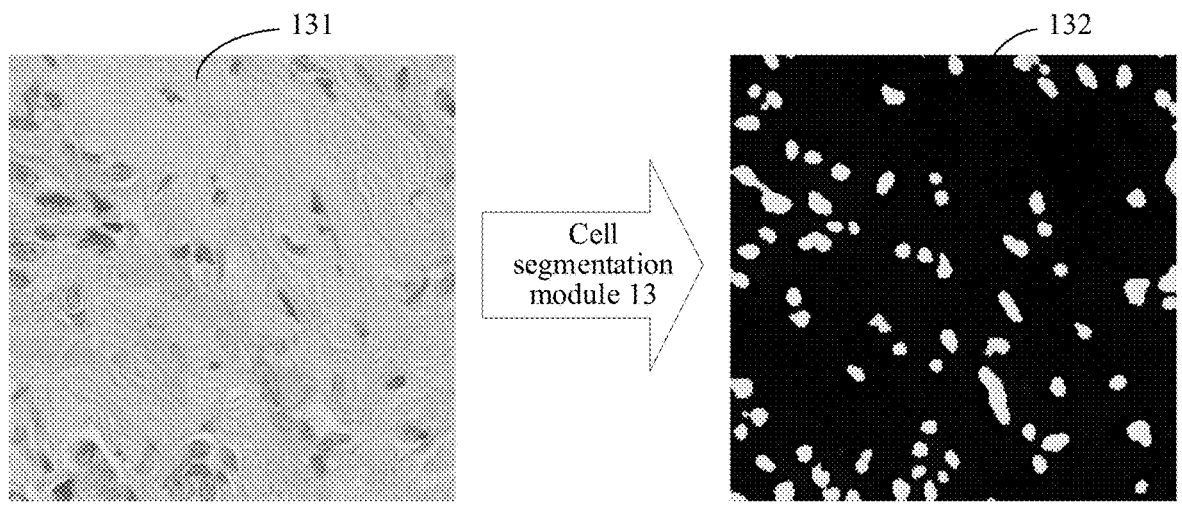
FIGS. 13A-13C are schematic diagrams showing results of processing various types of pathological images using a cell segmentation model according to an embodiment of this disclosure.
Figure 13B:
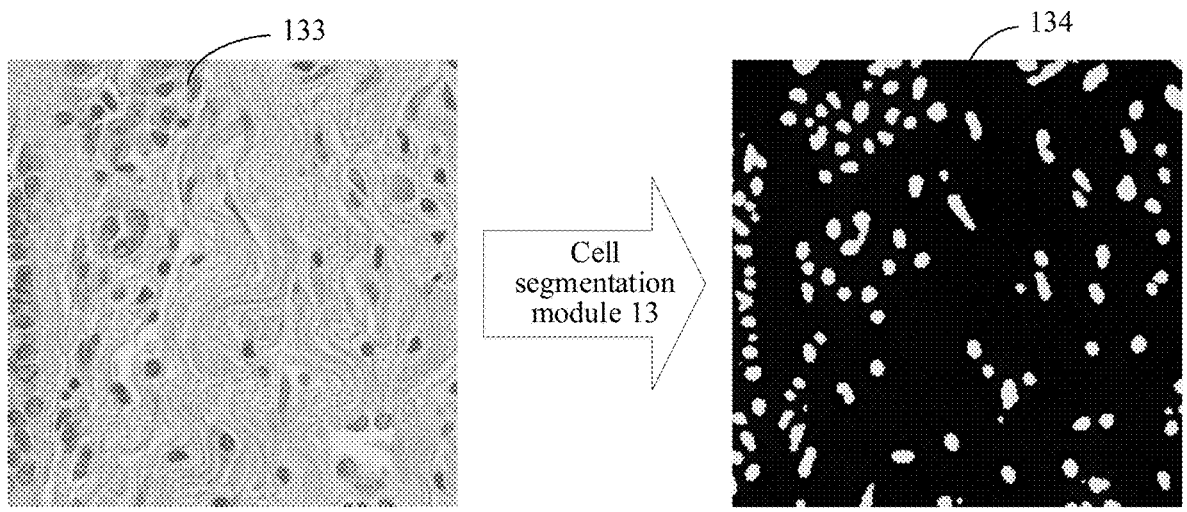
Figure 13C:
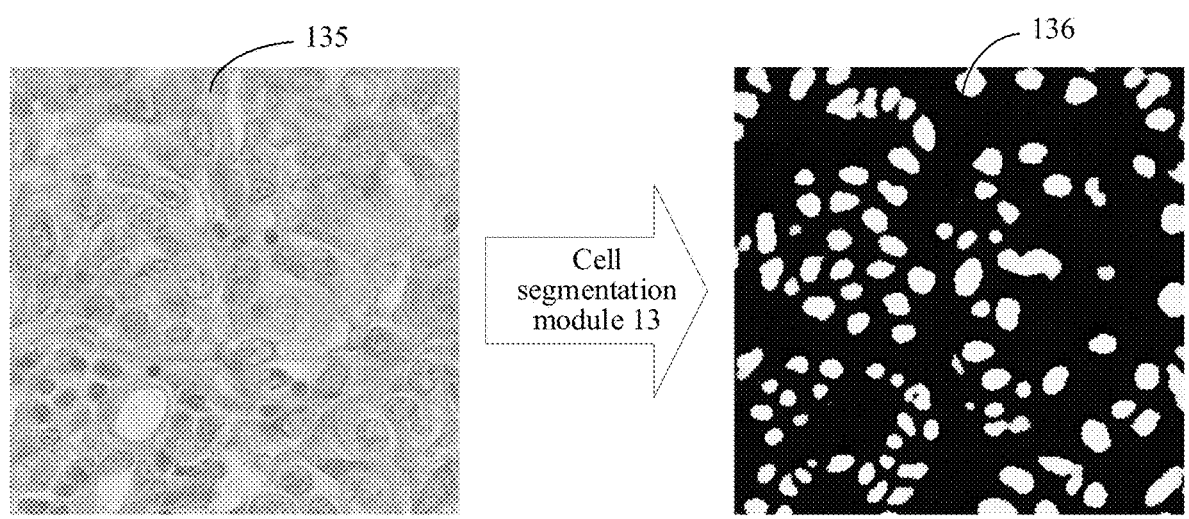

The image processing method provided in the embodiments of this disclosure has strong applicability, and can process various types of pathological pictures without relying on a hardware environment. FIG. 13A to FIG. 13C are schematic diagrams showing results of processing various types of pathological images using a cell segmentation model 13 according to an embodiment of this disclosure. As shown in FIG. 13A to FIG. 13C, a pathological image 131, a pathological image 133, and a pathological image 135 are input, and after the pathological image 131, the pathological image 133, and the pathological image 135 are respectively processed by the cell segmentation model 13, a processed image 132, a processed image 134, and a processed image 136 are obtained correspondingly.

In the embodiments of this disclosure, a preset number of iterations may be used, for example, three rounds of iterations may be used for training manual point annotation, and the number of iterations may be adjusted according to a difference in cell size. The FCN model in the segmentation model may also use another segmentation model to replace the LinkNet model, such as replacing the LinkNet model with the densenet model. The distance filter may also be replaced by a gaussian filter or the like.

An exemplary structure in which the image processing apparatus 354 provided in the embodiments of this disclosure is implemented as a software module is illustrated below continuously. In some embodiments, as shown in FIG. 3, a software module stored in the image processing apparatus 354 of the memory 350 may be the image processing apparatus in the server 300, including:

an acquisition module 3541 configured to acquire a target image having at least two division regions, each of the division regions including an annotation point, and each of the annotation points corresponding to a target segmentation object; an iterative expansion module 3542 configured to perform iterative expansion on each of the annotation points in the target image to obtain an iterative expansion region corresponding to the annotation point; a first determination module 3543 configured to determine a first loss result between the iterative expansion region and the division region and a second loss result between the iterative expansion region and the annotation point, respectively; a control module 3544 configured to stop the iterative expansion of the corresponding annotation point when the first loss result and the second loss result meet an iteration termination condition; and a second determination module 3545 configured to determine the iterative expansion region obtained when the iterative expansion is stopped as a region where a target segmentation object in the target image is located.

In some embodiments, the apparatus further includes a third determination module configured to determine, according to the first loss result and the second loss result of an $N^{th}$ iterative expansion, an iterative expansion parameter of an $(N+1)^{th}$ iterative expansion; and the iterative expansion module is configured to perform iterative expansion on each of the annotation points in the target image by using the iterative expansion parameter to obtain the iterative expansion region corresponding to the annotation point.

In some embodiments, the iterative expansion parameter includes an expansion distance; and the iterative expansion module is configured to perform, by taking each of the annotation points as a center and the expansion distance as a radius, iterative expansion on each of the annotation points in the target image to form the iterative expansion region corresponding to the annotation point.

In some embodiments, the third determination module is configured to acquire, when a sum of the first loss result and the second loss result of the $N^{th}$ iterative expansion is greater than a threshold, a pixel point of each of the annotation points in the iterative expansion region of the $N^{th}$ iterative expansion; determine a pixel distance between pixel points in adjacent iterative expansion regions of each of the annotation points; and determine, according to the pixel distance, an expansion distance for performing the $(N+1)^{th}$ iterative expansion to obtain the iterative expansion parameter.

In some embodiments, the control module is configured to acquire a first loss value corresponding to the first loss result and a second loss value corresponding to the second loss result; determine a loss value sum of the first loss value and the second loss value; and stop the iterative expansion of the annotation point when the loss value sum is less than a threshold.

In some embodiments, the iterative expansion module is configured to perform, by taking each of the annotation points as a center and a preset expansion distance as a radius, initial expansion on each of the annotation points in the target image to form a foreground region having at least two expansion regions; and perform, by taking each of the annotation points as a center and the preset expansion distance as a radius, at least one iterative expansion on each of the expansion regions in the foreground region to obtain the iterative expansion region corresponding to the annotation point.

In some embodiments, the target image is a pathological image, and the target segmentation object is a cell; and the second determination module is configured to determine the iterative expansion region obtained when the iterative expansion is stopped as a region where the cell in the pathological image is located.

In some embodiments, the apparatus further includes a processing module configured to process the target image by using an image segmentation model to obtain the region where the target segmentation object in the target image is located. The image segmentation model includes a fully convolutional network and an iterative expansion model, the fully convolutional network is used for performing image segmentation processing on a sample image, and the iterative expansion model is configured to perform iterative expansion on a sample annotation point in a sample image according to an iterative expansion parameter.

In some embodiments, the image segmentation model is obtained by training through the following steps: dividing a sample image having at least two sample annotation points to form a background region having at least two sample division regions; performing, by taking each of the sample annotation points as a center and a preset expansion distance as a radius, expansion on each of the sample annotation points in the sample image to form a foreground region having at least two sample expansion regions; inputting the foreground region into a fully convolutional network as a positive sample, for performing image segmentation processing to obtain a segmented processed image; inputting the processed image into a preset loss model to obtain a loss result; determining an iterative expansion parameter of the image segmentation model according to the loss result; and performing iterative expansion on the sample annotation point of the sample image by using the iterative expansion parameter, so as to implement iterative training of the image segmentation model.

In some embodiments, the image segmentation model is obtained by training through the following steps: determining a first sample loss value between the sample expansion region and the sample division region by using the preset loss model; determining a second sample loss value between the sample expansion region and the sample annotation point by using the preset loss model; and determining a sum of the first sample loss value and the second sample loss value as the loss result.

In some embodiments, the image segmentation model is obtained by training through the following steps: acquiring, when the loss result is greater than a threshold, a pixel point in a sample expansion region of each of the sample annotation points; determining a pixel distance between each of the sample annotation points and a pixel point in an adjacent sample expansion region; and determining the iterative expansion parameter of the image segmentation model according to the pixel distance.

In some embodiments, the processing module is configured to filter the processed image according to the iterative expansion parameter to obtain a filtered processed image. Correspondingly, the image segmentation model is obtained by training through the following step: performing the iterative expansion on the sample expansion region in the filtered processed image by using the iterative expansion parameter, so as to implement the iterative training of the image segmentation model.

Descriptions of the foregoing apparatus embodiments of this disclosure are similar to the descriptions of the method embodiments. The apparatus embodiments have beneficial effects similar to those of the method embodiments and thus are not repeatedly described. For technical details that are not disclosed in the apparatus embodiments, refer to the descriptions of the method embodiments of this disclosure for understanding.

An embodiment of this disclosure provides a computer program product or a computer program. The computer program product or the computer program includes computer instructions, and the computer instructions are stored in a computer-readable storage medium. A processor of a computer device reads the computer instructions from the computer-readable storage medium and executes the computer instructions to cause the computer device to perform the method in the embodiments of this disclosure An embodiment of this disclosure provides a storage medium storing an executable instructions. When the executable instructions are executed by a processor, the processor is caused to perform the method in the embodiments of this disclosure, such as the method shown in FIG. 4.

In some embodiments, the storage medium may be a computer-readable storage medium, for example, a Ferromagnetic Random Access Memory (FRAM), a Read Only Memory (ROM), a Programmable Read Only Memory (PROM), an Erasable Programmable Read Only Memory (EPROM), an Electrically Erasable Programmable Read Only Memory (EEPROM), a Flash Memory, a Magnetic Surface Memory, an Optical Disk, or a Compact Disk-Read Only Memory (CD-ROM), or another memory; or may be any device including one of or any combination of the foregoing memories.

In some embodiments, the executable instructions can be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a hypertext markup language (HTML) file, stored in a file that is specially used for a program in discussion, or stored in the plurality of collaborative files (for example, be stored in files of one or modules, subprograms, or code parts). In an example, the executable instructions can be deployed for execution on one computing device, execution on a plurality of computing devices located at one location, or execution on a plurality of computing devices that are distributed at a plurality of locations and that are interconnected through a communication network.

The foregoing descriptions are merely embodiments of this disclosure and are not intended to limit the protection scope of this disclosure. Any modification, equivalent replacement, or improvement made without departing from the spirit and range of this disclosure shall fall within the protection scope of this disclosure.

INDUSTRIAL PRACTICABILITY

In the embodiments of this disclosure, iterative expansion is performed on each annotation point in a target image to obtain an iterative expansion region corresponding to the annotation point. Then, a first loss result between the iterative expansion region and a division region and a second loss result between the iterative expansion region and the annotation point are determined respectively. When the first loss result and the second loss result meet an iteration termination condition, the iterative expansion of the annotation point is stopped. The iterative expansion region obtained when the iterative expansion is stopped is determined as a region where a target segmentation object in the target image is located. In this way, the size of the formed iterative expansion region is closer to the size of the target segmentation object, so that the target segmentation object can be segmented accurately, which has high industrial practicability.

What is claimed is:

1. An image processing method, comprising:
    acquiring a target image having at least two division regions, each of the division regions comprising an annotation point, and each of the annotation points corresponding to a target segmentation object;
    performing iterative expansion on each of the annotation points in the target image to obtain an iterative expansion region corresponding to the annotation point;
    determining a first loss result between the iterative expansion region and the division region and a second loss result between the iterative expansion region and the annotation point, respectively;
    in response to the first loss result and the second loss result meeting an iteration termination condition, stopping the iterative expansion of the annotation point to obtain a resulting iterative expansion region corresponding to the annotation point; and
    determining the resulting iterative expansion region as a region where the target segmentation object is located in the target image.

2. The method according to claim 1, wherein the method further comprises:
    determining, according to the first loss result and the second loss result of an $N^{th}$ iterative expansion, an iterative expansion parameter of an $(N+1)^{th}$ iterative expansion, wherein N is greater than or equal to 1; and
    the performing iterative expansion on each of the annotation points comprises:

performing iterative expansion on each of the annotation points in the target image using the iterative expansion parameter to obtain the iterative expansion region corresponding to the annotation point.

3. The method according to claim 2, wherein the iterative expansion parameter comprises an expansion distance, and the performing iterative expansion on each of the annotation points in the target image using the iterative expansion parameter to obtain the iterative expansion region comprises:
performing, by taking each of the annotation points as a center and the expansion distance as a radius, iterative expansion on each of the annotation points in the target image to form the iterative expansion region corresponding to the annotation point.

4. The method according to claim 2, wherein the determining the iterative expansion parameter of the $(N+1)^{th}$ iterative expansion comprises:
in response to a sum of the first loss result and the second loss result of the $N^{th}$ iterative expansion being greater than a threshold, acquiring a pixel point of each of the annotation points in the iterative expansion region of the $N^{th}$ iterative expansion;
determining a pixel distance between pixel points in adjacent iterative expansion regions of each of the annotation points; and
determining, according to the pixel distance, an expansion distance for performing the $(N+1)^{th}$ iterative expansion to obtain the iterative expansion parameter.

5. The method according to claim 1, wherein the stopping the iterative expansion of the annotation point comprises:
acquiring a first loss value corresponding to the first loss result and a second loss value corresponding to the second loss result;
determining a loss value sum of the first loss value and the second loss value; and
stopping the iterative expansion of the annotation point in response to the loss value sum being less than a threshold.

6. The method according to claim 1, wherein the performing iterative expansion on each of the annotation points comprises:
performing, by taking each of the annotation points as a center and a preset expansion distance as a radius, initial expansion on each of the annotation points in the target image to form a foreground region having at least two expansion regions; and
performing, by taking each of the annotation points as a center and the preset expansion distance as a radius, at least one iterative expansion on each of the expansion regions in the foreground region to obtain the iterative expansion region corresponding to the annotation point.

7. The method according to claim 1, wherein the target image is a pathological image, and the target segmentation object is a cell; and the determining the resulting iterative expansion region as the region where the target segmentation object is located in the target image comprises:
determining the resulting iterative expansion region as the region where the cell is located in the pathological image.

8. The method according to claim 1, wherein the method further comprises:
processing the target image using an image segmentation model to obtain the region where the target segmentation object is located in the target image, the image segmentation model comprising a fully convolutional network, and the fully convolutional network being for performing image segmentation processing on sample images.

9. The method according to claim 8, wherein the method further comprises training the image segmentation model by:
dividing a sample image having at least two sample annotation points to form a background region having at least two sample division regions;
performing, by taking each of the sample annotation points as a center and a preset expansion distance as a radius, expansion on each of the sample annotation points in the sample image to form a foreground region having at least two sample expansion regions;
inputting the foreground region into a fully convolutional network as a positive sample, for performing image segmentation processing to obtain a segmented processed image;
inputting the processed image into a preset loss model to obtain a loss result;
determining an iterative expansion parameter of the image segmentation model according to the loss result; and
performing iterative expansion on the sample annotation point of the sample image using the iterative expansion parameter.

10. The method according to claim 9, wherein the inputting the processed image into the preset loss model to obtain the loss result comprises:
determining a first sample loss value between the sample expansion region and the sample division region using the preset loss model;
determining a second sample loss value between the sample expansion region and the sample annotation point using the preset loss model; and
determining a sum of the first sample loss value and the second sample loss value as the loss result.

11. The method according to claim 9, wherein the determining the iterative expansion parameter of the image segmentation model according to the loss result comprises:
acquiring, in response to the loss result being greater than a threshold, a pixel point in a sample expansion region of each of the sample annotation points;
determining a pixel distance between each of the sample annotation points and a pixel point in an adjacent sample expansion region; and
determining the iterative expansion parameter of the image segmentation model according to the pixel distance.

12. The method according to claim 9, wherein the method further comprises:
filtering the processed image according to the iterative expansion parameter to obtain a filtered processed image; and
the performing iterative expansion on the sample annotation point of the sample image using the iterative expansion parameter comprises:
performing the iterative expansion on a sample expansion region in the filtered processed image using the iterative expansion parameter.

13. An image processing method, comprising:
acquiring a pathological image having at least two division regions, each of the division regions comprising an annotation point, and each of the annotation points corresponding to a cell;

performing iterative expansion on each of the annotation points in the pathological image to obtain an iterative expansion region corresponding to the annotation point;

determining a first loss result between the iterative expansion region and the division region and a second loss result between the iterative expansion region and the annotation point, respectively;

in response to the first loss result and the second loss result meeting an iteration termination condition, stopping the iterative expansion of the annotation point to obtain a resulting iterative expansion region corresponding to the annotation point; and determining the resulting iterative expansion region as a region where the cell is located in the pathological image.

14. An image processing apparatus, comprising:
a memory operable to store machine-readable instructions; and
a processor circuitry operable to read the machine-readable instructions, the processor circuitry when executing the machine-readable instructions is configured to:
acquire a target image having at least two division regions, each of the division regions comprising an annotation point, and each of the annotation points corresponding to a target segmentation object;
perform iterative expansion on each of the annotation points in the target image to obtain an iterative expansion region corresponding to the annotation point;
determine a first loss result between the iterative expansion region and the division region and a second loss result between the iterative expansion region and the annotation point, respectively;
in response to the first loss result and the second loss result meeting an iteration termination condition, stop the iterative expansion of the annotation point to obtain a resulting iterative expansion region corresponding to the annotation point; and
determine the resulting iterative expansion region as a region where the target segmentation object is located in the target image.

15. The apparatus according to claim 14, wherein the processor circuitry is further configured to:
determine, according to the first loss result and the second loss result of an $N^{th}$ iterative expansion, an iterative expansion parameter of an $(N+1)^{th}$ iterative expansion, wherein N is greater than or equal to 1; and
perform iterative expansion on each of the annotation points in the target image using the iterative expansion parameter to obtain the iterative expansion region corresponding to the annotation point.

16. The apparatus according to claim 15, wherein the iterative expansion parameter comprises an expansion distance, the processor circuitry is configured to:
perform, by taking each of the annotation points as a center and the expansion distance as a radius, iterative expansion on each of the annotation points in the target image to form the iterative expansion region corresponding to the annotation point.

17. The apparatus according to claim 15, wherein the processor circuitry is configured to:
in response to a sum of the first loss result and the second loss result of the $N^{th}$ iterative expansion being greater than a threshold, acquire a pixel point of each of the annotation points in the iterative expansion region of the $N^{th}$ iterative expansion;
determine a pixel distance between pixel points in adjacent iterative expansion regions of each of the annotation points; and
determine, according to the pixel distance, an expansion distance for performing the $(N+1)^{th}$ iterative expansion to obtain the iterative expansion parameter.

18. The apparatus according to claim 14, wherein the processor circuitry is configured to:
acquire a first loss value corresponding to the first loss result and a second loss value corresponding to the second loss result;
determine a loss value sum of the first loss value and the second loss value; and
stop the iterative expansion of the annotation point in response to the loss value sum being less than a threshold.

19. The apparatus according to claim 14, wherein the processor circuitry is configured to:
perform, by taking each of the annotation points as a center and a preset expansion distance as a radius, initial expansion on each of the annotation points in the target image to form a foreground region having at least two expansion regions; and
perform, by taking each of the annotation points as a center and the preset expansion distance as a radius, at least one iterative expansion on each of the expansion regions in the foreground region to obtain the iterative expansion region corresponding to the annotation point.

20. The apparatus according to claim 14, wherein the processor circuitry is configured to:
process the target image using an image segmentation model to obtain the region where the target segmentation object is located in the target image, the image segmentation model comprising a fully convolutional network, and the fully convolutional network being for performing image segmentation processing on sample images.

* * * * *